(12) United States Patent
Garg et al.

(10) Patent No.: US 7,783,744 B2
(45) Date of Patent: Aug. 24, 2010

(54) FACILITATING ROOT CAUSE ANALYSIS FOR ABNORMAL BEHAVIOR OF SYSTEMS IN A NETWORKED ENVIRONMENT

(75) Inventors: Atul Garg, Bangalore, CA (US); Joe Scarpelli, Mountain View, CA (US); Dasari Subramanyeswara Rao, Bangalore (IN); Anjaneyulu Ramakrishna Tadikamalla, Bangalore (IN); Kartik Kumar Peyyeti, Bangalore (IN); Kannan Ramanathan Kumba, Bangalore (IN); Nagaraj Mysore Narayanarao, Bangalore (IN)

(73) Assignee: BMC Software, Inc., Houston, TX (US)

( * ) Notice: Subject to any disclaimer, the term of this patent is extended or adjusted under 35 U.S.C. 154(b) by 303 days.

(21) Appl. No.: 11/308,430

(22) Filed: Mar. 24, 2006

(65) Prior Publication Data

US 2006/0200373 A1 Sep. 7, 2006

Related U.S. Application Data

(63) Continuation of application No. 11/160,664, filed on Jul. 5, 2005, now Pat. No. 7,689,628, and a continuation of application No. 11/161,313, filed on Jul. 29, 2005, now Pat. No. 7,502,844, and a continuation of application No. 10/452,134, filed on Jun. 3, 2003.

(51) Int. Cl.
*G06F 15/16* (2006.01)
(52) U.S. Cl. ...................................... 709/224
(58) Field of Classification Search ................. 709/223, 709/224
See application file for complete search history.

(56) References Cited

U.S. PATENT DOCUMENTS 6,738,933 B2 * 5/2004 Fraenkel et al. ............... 714/47
7,028,228 B1 * 4/2006 Lovy et al. ..................... 714/57

* cited by examiner

*Primary Examiner*—William C Vaughn, Jr.
*Assistant Examiner*—Scott Christensen
(74) *Attorney, Agent, or Firm*—Narendra Reddy Thappeta

(57) ABSTRACT

To facilitate gathering of information required for root cause analysis associated with the abnormal behavior of an attribute ("problem attribute"), a user can specify causation attributes associated with the problem attribute. When the abnormal behavior is detected for the problem attribute, the causation attributes are automatically polled and stored in a database. The user can later examine the values of the causation attributes to determine if there is a causal relationship to the abnormal behavior of the problem attribute.

12 Claims, 22 Drawing Sheets

FIG. 12C

FACILITATING ROOT CAUSE ANALYSIS FOR ABNORMAL BEHAVIOR OF SYSTEMS IN A NETWORKED ENVIRONMENT

RELATED APPLICATIONS

The present application is related to the following co-pending US applications, which are all incorporated by reference in their entirety into the present application:

1. Ser. No. 10/452,134; Filed: Jun. 3, 2003, entitled, "Network Management System to Monitor Managed Elements"; and 2. Ser. No. 11/160,664; Filed: Jul. 5, 2005, entitled, "Monitoring Several Distributed Resource Elements as a Resource Pool"

3. Ser. No. 11/161,313; Filed: Jul. 29, 2005, entitled, "Abnormality Indicator Of a Desired Group Of Resource Elements"

BACKGROUND OF THE INVENTION

1. Field of the Invention

The present invention relates to network management systems, and more specifically to a method and apparatus for facilitating root cause analysis for abnormal behavior of systems in a networked environment.

2. Related Art

A networked environment generally contains various end systems (e.g., user/client systems, server systems) connected by a network. The network itself may be formed from various connecting systems such as routers and bridges. All the end systems and connecting systems (and any other system sought to be monitored) together are conveniently referred to as resource elements in the present application.

Network monitoring systems are often implemented to detect abnormal behavior of various resource elements. Abnormal behavior of a resource element with respect to an attribute (e.g., processing power, utilization, etc.) is generally said to be present when the value of the attribute falls outside of an acceptable range. The acceptable ranges are often represented as thresholds, which are either specified by users or computed dynamically (e.g., based on prior behavior).

It is often desired that root cause analysis be performed to determine the cause for any abnormal behavior of a resource element. Root cause analysis generally entails examining values of various related attributes to understand the reason for the abnormal behavior of a resource element with respect to an attribute of interest. In general, it is desirable that sufficient relevant information be available to the user performing such root cause analysis.

BRIEF DESCRIPTION OF THE DRAWINGS

The present invention will be described with reference to the accompanying drawings, wherein:

FIGS. 12A-12C contain display screens which contain data relevant to some of the causation attributes which are gathered at time points when there was an abnormality.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, a user can specify various attributes ("causation attributes") associated with an attribute ("problem attribute") for which root cause analysis is of interest (in case of abnormal behavior experienced with respect to the problem attribute). The network monitoring system then automatically monitors the problem attributes such that the user can examine the values of the problem attributes when root cause analysis is being performed.

In one embodiment, the causation attributes are monitored during normal conditions as well as upon detection of abnormal conditions. As a result, the user may have information on the monitored values of the causation attributes during normal and abnormal conditions of the problem attribute. By using such information, the root cause analysis for the abnormality of the problem attribute can be facilitated.

According to another aspect of the present invention, the monitored values for the causation attributes are saved in the same database as the values for the problem attributes. As a result, common interfaces can potentially be used without requiring additional design/development overhead to store the monitored values for the causation attributes.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
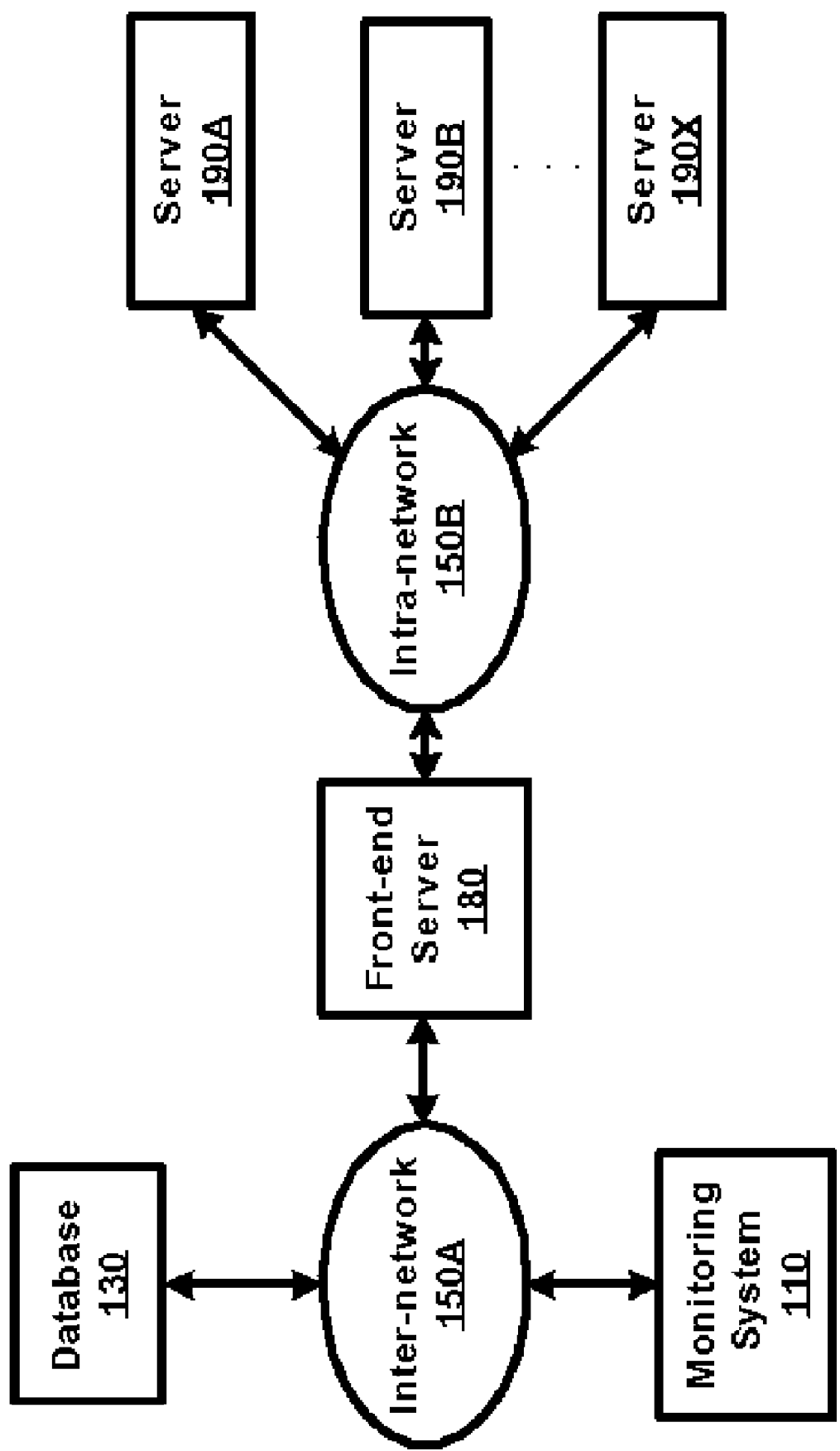
FIG. 1 is a block diagram illustrating an example environment in which various aspects of the present invention can be implemented.

FIG. 1 is a block diagram illustrating an example environment in which various aspects of the present invention can be implemented. The environment is shown containing monitoring system 110, database 130, inter_network 150A, intra_network 150B, front_end server 180, and servers 190_A through 190_X. It should be appreciated that only a few representative systems and components are shown in FIG. 1 for illustration. However, typical environments contain several more (types) systems. Each system of FIG. 1 is described below in further detail.

Servers 190A_190X represent example resource elements sought to be monitored according to various aspects of the present invention. However, other systems such as front-end server 180, database 150A, switches in the networks, and monitoring system also can form resource elements. All the servers are shown connected to intra_network 150B. Front_end 180 receives various requests from inter_network 150A, and distributes the requests to one of servers 190A_190X, for example, according to a known approach.

Database 130 enables storing and retrieval (accessed in general) of desired data using structure queries. In the case of relational database technologies, schemas may be specified to define various tables, and the attribute values associated with various monitored resource elements may be stored in such tables. Additionally, database 130 may contain schemas/tables to enable storing of configuration details of attributes (such as polling interval, threshold values) and monitored resource elements.

Monitoring system 110 enables monitoring of various resource elements and facilitates performing of the root cause analysis for abnormal behavior of systems in a networked environment according to various aspects of the present invention as described below in further detail.

3. Monitoring Resource Pool

Figure 2:
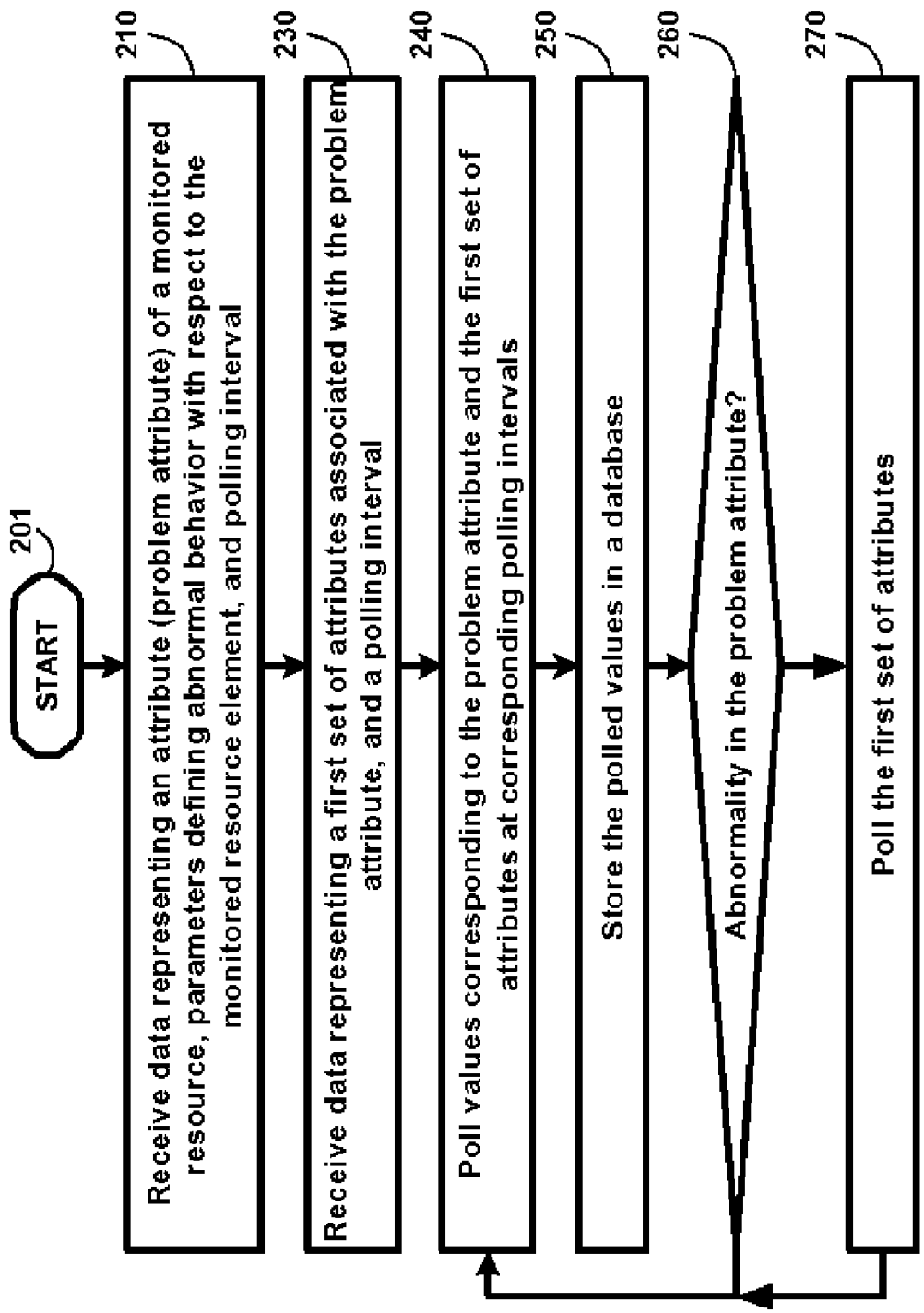
FIG. 2 is a flow chart illustrating the manner in which information can be gathered to perform root cause analysis according to various aspects of the present invention.

FIG. 2 is a flowchart illustrating the manner in which a monitoring system may facilitate root cause analysis for abnormal behavior of systems according to an aspect of the present invention. The flowchart is described below with respect to FIG. 1 for illustration. However, the features can be implemented in other environments also, as will be apparent to one skilled in the relevant arts by reading the disclosure provided herein. The flowchart begins in step 201, in which control passes to step 210.

In step 210, monitoring system 110 receives data representing an attribute (problem attribute) of a resource element of interest, parameters defining abnormal behavior for the problem attribute, and polling interval. In an embodiment, a user provides such data using a graphical user interface, and the entered data is received in monitoring system 110.

In step 230, monitoring system 110 receives data representing a first set of attributes associated with the problem attribute, and a polling interval. Information on the first set of attributes ("causation attributes") would be of interest in performing root cause analysis when abnormal behavior is encountered with respect to the problem attribute. The polling interval indicates the polling cycle for collection of values associated with the causation attributes in time periods corresponding to when the problem attribute is not exhibiting abnormal behavior.

In step 240, monitoring system 110 polls the monitored resources for values corresponding to the problem attribute and the first set of attributes ("causation attributes") at corresponding specified polling intervals and in step 250, monitoring system 110, stores the polled values in database 130.

In step 260, monitoring system 110 determines if there was any abnormality in the problem attribute. In an embodiment of the present invention, such a determination is performed by determining if a value associated with the problem attribute at a polling interval is outside the range indicated by the corresponding threshold value. Alternatively, the threshold value can be determined dynamically based on a combination of one or more of prior history, user inputs, etc. Control passes to step 270, if there was an abnormality in the problem attribute and to control 240 otherwise.

In step 270, monitoring system 110 polls for the first set of attributes. In an embodiment, the first set of attributes are polled at a lower polling interval (compared to in the normal behavior) to determine values corresponding to the time points immediately after the occurrence of the abnormality. Control passes to step 240.

It should be appreciated that due to the polling of step 270, information related to the causation attributes is available immediately after the detection of the abnormal condition for the problem attribute. In addition, base information for the causation attributes during normal behavior of the problem attribute is also available, thereby facilitating root cause analysis.

The approaches described above can be implemented in various embodiments. An example implementation of monitoring system 110 is described below.

4. Monitoring System

Figure 3:
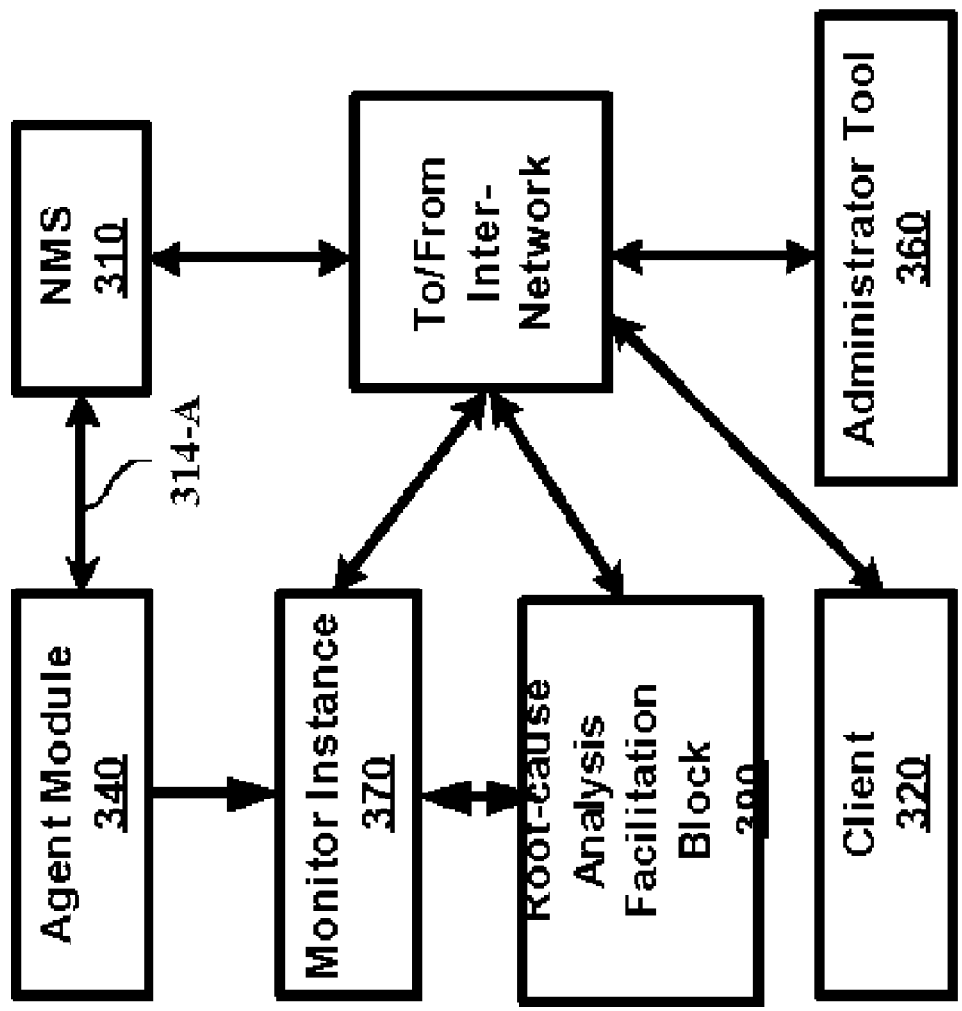
FIG. 3 is a block diagram illustrating the details of a monitoring system in an embodiment of the present invention.

FIG. 3 is a block diagram illustrating the details of monitoring system 110 in one embodiment. Monitoring system 110 is shown containing network management station (NMS) 310, client 320, agent module 340, administrator tool 360, monitor instance 370 and root cause analysis facilitation block 390. Each block is described below in further detail.

Only the details of monitoring system 110 (or blocks therein), as believed to be relevant to understanding the implementation of the described embodiment(s), are provided in the present application. For further details of monitoring system 110, the reader is referred to the co-pending applications noted in the related applications section above.

NMS 310 operates as a central point at which the operation of other blocks on monitoring system 110 is coordinated. NMS 310 contains definition of attributes associated with various monitor types corresponding to various resource elements. In general, a monitor type is provided with each resource element type sought to be monitored. A monitor instance may then be instantiated for each resource element (unit) sought to be monitored.

Each monitor type contains the attributes that can be potentially monitored for the corresponding resource element type. As there can be many attributes, not all attributes may be monitored in either the default configurations provided by the vendor of monitoring system 110 or by specific configuration of the users later. Various aspects of the present invention enable a user to specifically specify the (causation) attributes that are relevant to root cause analysis and monitoring system 110 monitors the causation attributes with appropriate polling frequencies, as described below in further detail.

Thus, NMS 310 provides a suitable user interface using which a user may specify problem attributes for a resource element and corresponding threshold value(s) used to determine any abnormality of the problem attribute. NMS 310 also provides a suitable user interface using which a user may specify causation attributes associated with some of the problem attributes and corresponding polling interval for the causation attributes. As described in further detail in the co-pending application, NMS 310 interfaces with agent module 340 to instantiate monitor instance 370.

Agent module 340 instantiates monitor instance 370 to monitor a specified resource element (e.g., server 190A), as specified by NMS 310. Agent module 340 can be implemented either on NMS 310 or in another digital processing system connected to intra-network 150.

Monitor instance 370 represents an entity (e.g., a process executing on a system) which actively samples/polls the status values of various problem attributes of interest and the corresponding causation attributes for a resource element specified by the user at regular corresponding polling intervals. The sampled values may be sent via network 150A to database 130. In addition, monitor instance 370 polls (causation attributes) upon specific request from root cause analysis facilitation block 390. The polled values corresponding to the causation attributes are also stored in database 130. Monitor instance 370 may be instantiated/created by using agent module 340.

Root cause analysis facilitation block 390 determines if there was an abnormality in the problem attributes associated with any of the monitored resource elements from the data polled by the corresponding monitor instances. In general, deviations from desired behavior may be deemed to be abnormalities, and the user can define the desired behavior in any manner, as suited for the specific environments. Root cause analysis facilitation block 390 then interfaces with the monitor instance to cause polling of the causation attributes specified associated with the problem attribute.

Administrator tool 360 is used by an administrator/user to configure problem attributes and the associated causation attributes for a monitor instance. Administrator tool 360 may be provided from any system, while NMS 310 provides the server interface for a suitable user interface. The manner in which a user may configure the problem and causation attributes associated with a monitor type according to various aspects of the present invention is described below in further detail.

Client 320 provides a suitable user interface using which users may view the data values corresponding to problem and causation attributes of various resource elements monitored according to various aspects of the present invention. NMS 310 may provide the corresponding information using a suitable user interface.

The description is continued with respect to an architecture view of an example embodiment of NMS 310.

5. Network Management Station (NMS)

Figure 4:
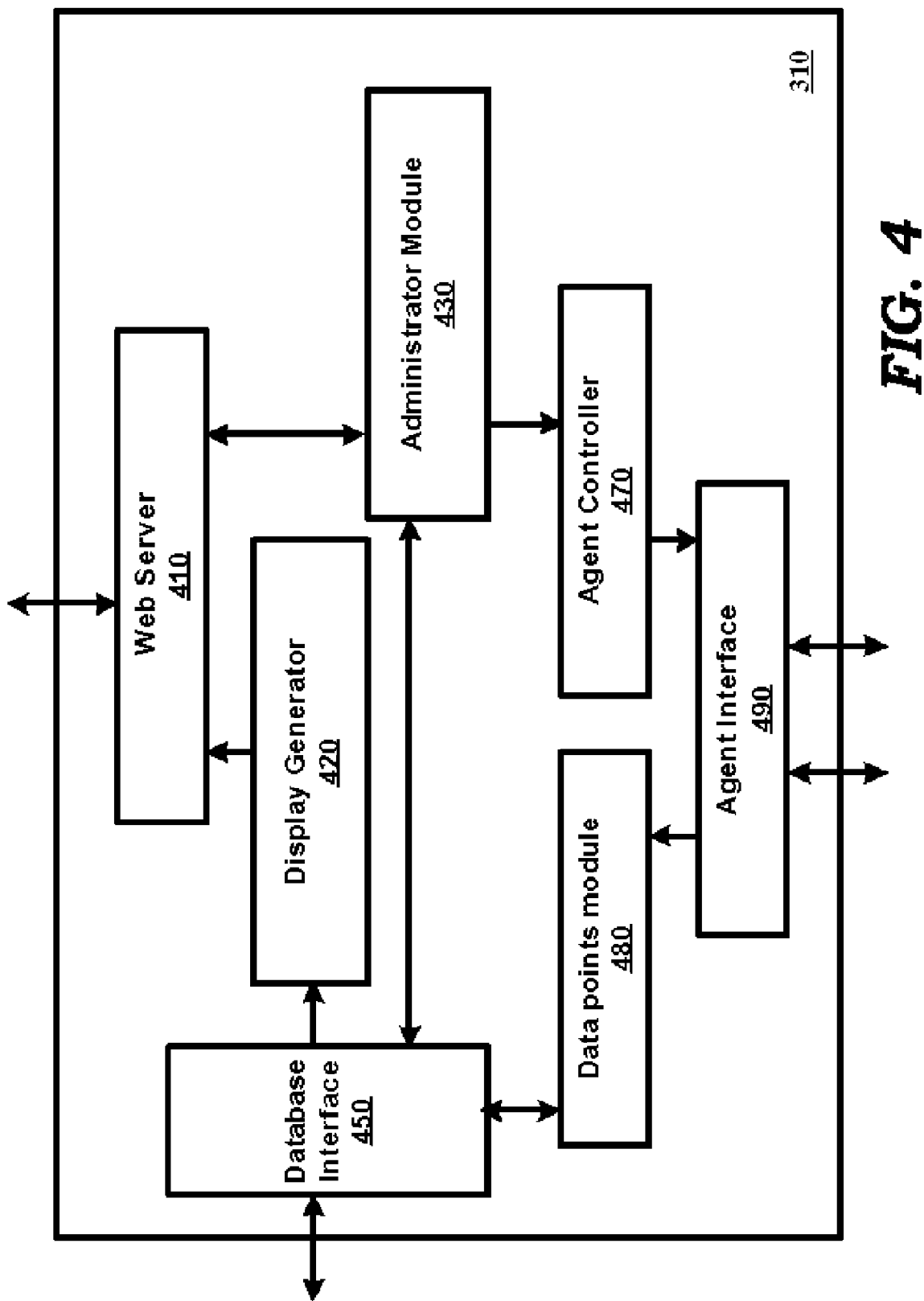
FIG. 4 is a block diagram illustrating the details of a network management station in an embodiment of the present invention.

FIG. 4 is a block diagram illustrating the details of NMS 310 in one embodiment. NMS 310 is shown containing web server 410, display generator 420, administrator module 430, database interface 450, agent controller 470, data points module 480, and agent interface 490. Each component is described below in further detail.

Web server 410 provides interface to client 320 and administrator tool 360 to interact with other modules in NMS 310. In an embodiment, a request for a web page is received in the form of a URL and associated parameters, and web server 410 communicates with an application server (not shown) to provide the appropriate interface for client 320 and administrator tool 360. The application server may be implemented to contain administrator module 430 and display generator 420. Web server 410 and the application server may be implemented using products available in the market-place as will be apparent to one skilled in the relevant arts.

Display generator 420 retrieves the values for problem attribute and corresponding causation attributes from database 130, and interfaces with web server 410 to cause the values to be displayed according to a suitable user interface (thereby facilitating root cause analysis since the values can be correlated on a time scale). Assuming that values of problem attribute and causation attributes stored in database 130 are for various resource elements of interest specified by potentially different administrators, display generator 420 receives the identifier of the specific resource element, retrieves the corresponding data from database 130, and causes the values to be displayed by a suitable user interface.

Administrator module 430 provides appropriate interface for administrator tool 360 to enable an administrator to define, configure and instantiate monitor instances, in addition to users specifying problem attribute, causation attributes, polling period for both problem attribute and causation attributes and threshold values for the problem attribute.

Data points module 480 receives various sampled values related to attributes being monitored by the corresponding monitor instances, and determines the manner in which the data points need to be processed. At least some of the data points may be stored in database 130 by communicating with database interface 450.

Agent controller 470 operates under the control of administrator tool 360 (via administrator module 430) to instantiate various monitor instances, and to provide the appropriate configuration parameters. In general, each monitor instance may be provided information indicating the specific attributes to be monitored, polling frequency etc., in addition to the program logic enabling the monitor instance to poll the device for the data point. Agent interface 490 enables communication with each of the monitor instances according to the specific medium/protocol using which the monitor instance can be contacted.

The description is continued with reference to the manner in which several aspects of the present invention may be implemented in the embodiment(s) described above. According to an aspect of the present invention, a user can 'add' attributes that can be specified as either causation attributes or problem attributes. The manner in which such attributes can be created is described below.

6. Adding Attributes

For illustration, it is assumed that it is desirable to add information on the connections presently being served by a network element (server) as an attribute associated with a monitor type (resource element type for which the monitor is designed), and it is assumed that netstat represents a utility that provides such desired information. Accordingly, a user may add that attribute ("netstat") as described below with respect to FIGS. 5A-5D.

FIG. 5A-5D contains graphical user interface using which a user may add a new attribute associated with a monitor type in one embodiment. With respect to FIG. 5A, selection of control 510 (diagnostic Wizard/Script) initiates definition of an attribute and control passes to FIG. 5B.

Figure 5A:
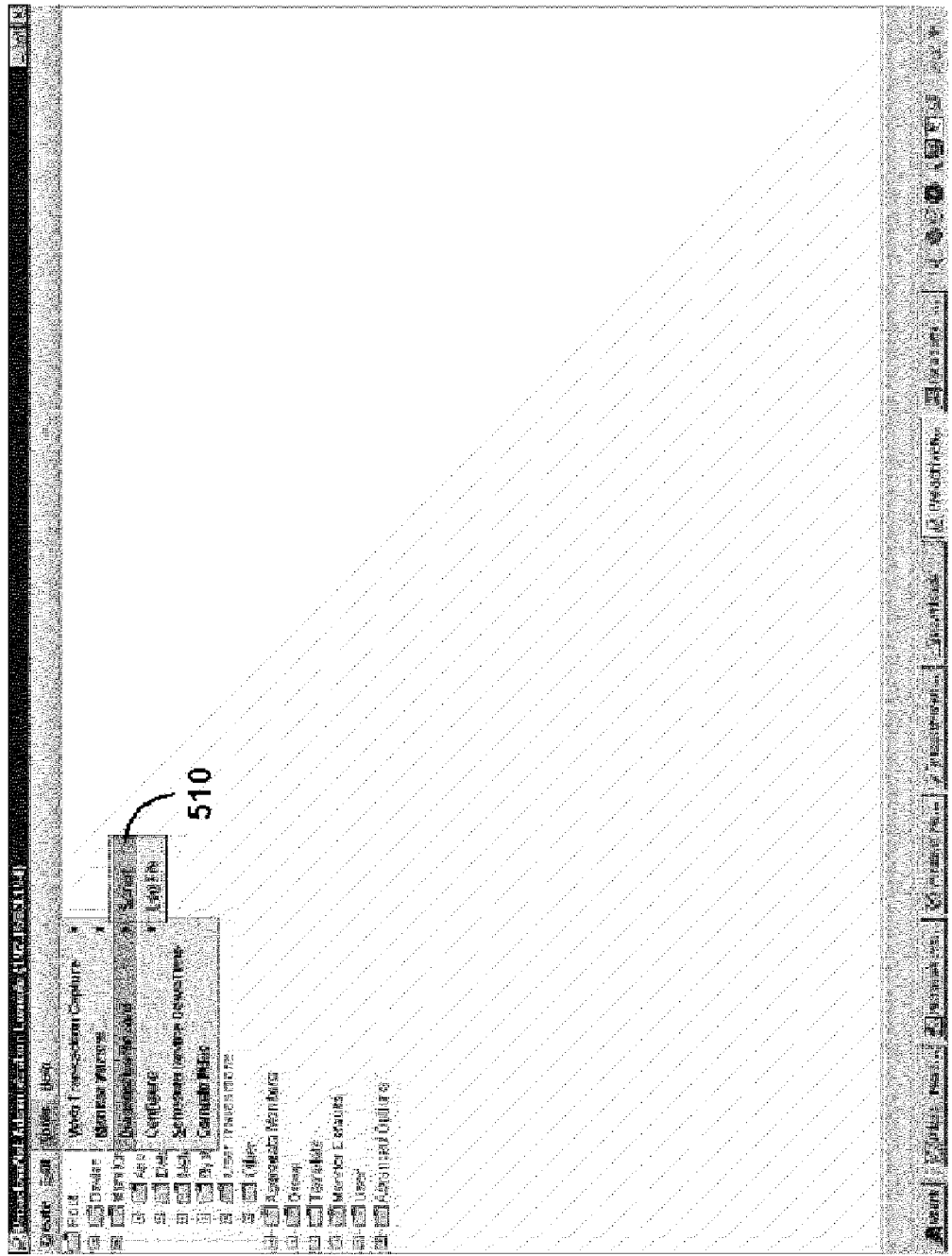
FIGS. 5A-5D contain a graphical user interface using which an administrator or user can add a new attribute for monitoring in an embodiment.
Figure 5B:
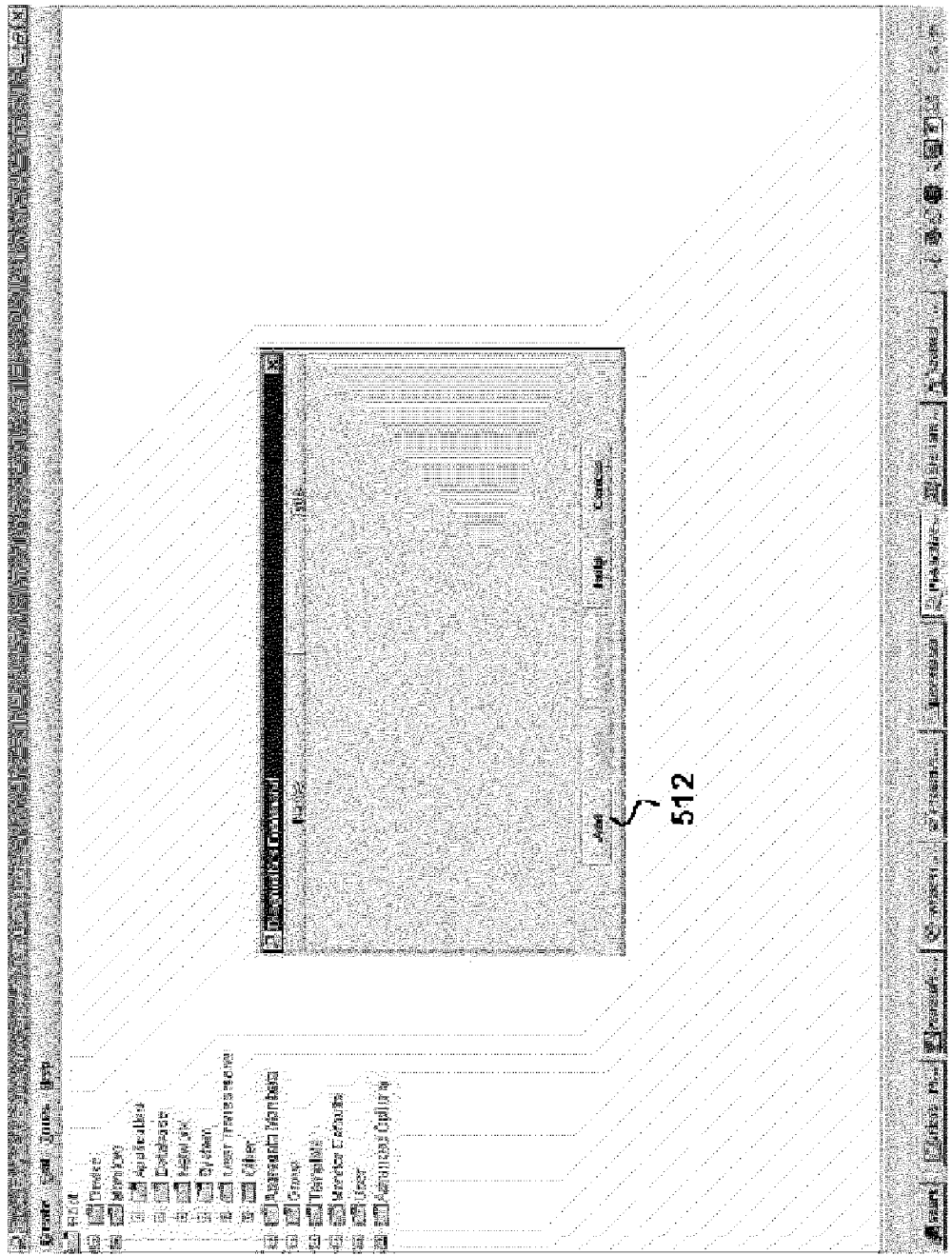
Figure 5C:
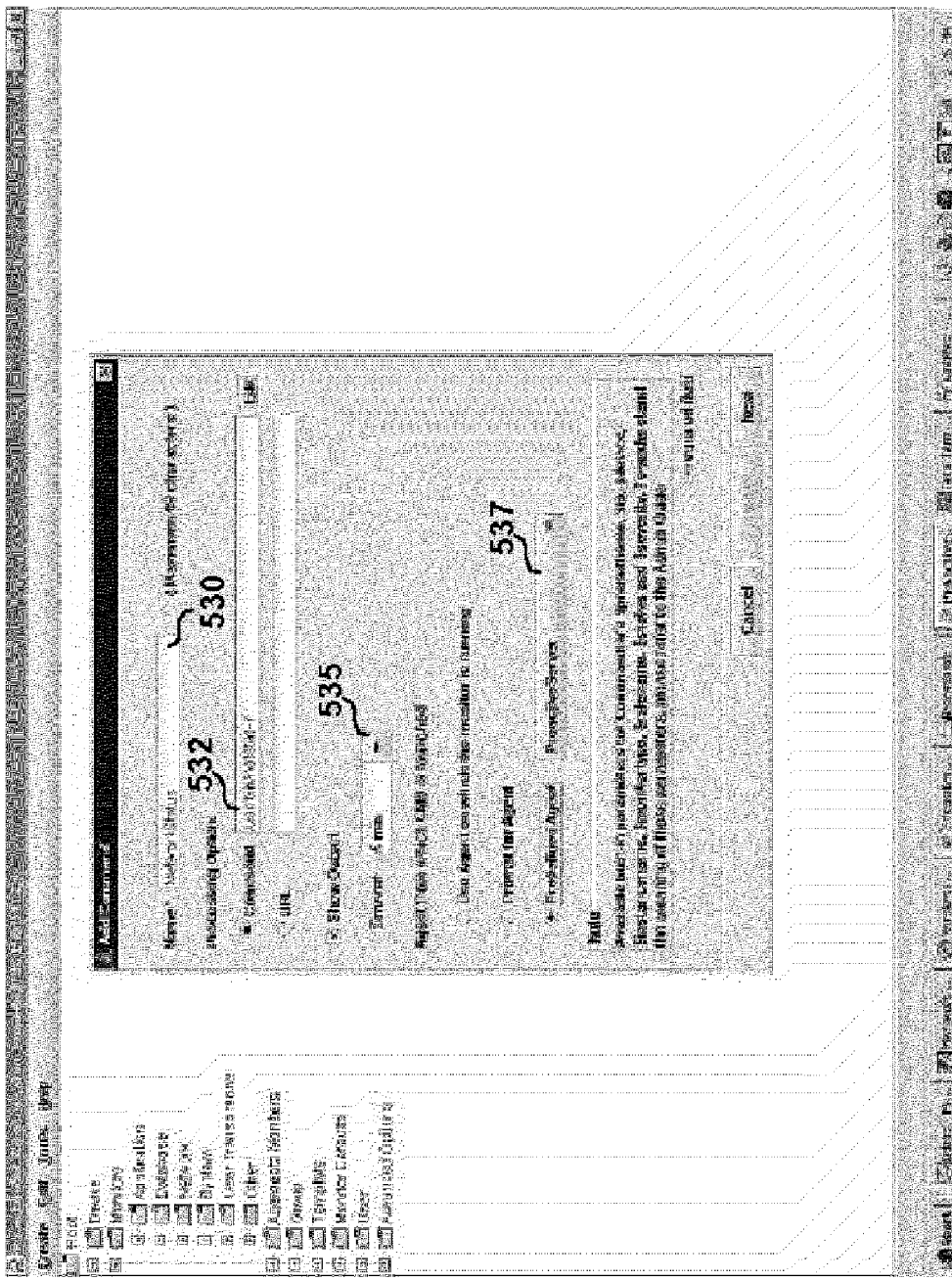

In FIG. 5B contains a graphical user interface using which a user may initiate either adding of a causation attribute of interest or may modify any existing causative attribute. The blank portion of the screen would list all the causation attributes previously defined (so that any desired attribute can be edited). Selecting add control 512 enables a user to add an attribute. Accordingly, the graphical user interface of FIG. 5C is displayed to the users. With respect to FIG. 5C, label 530 enables a user to specify a unique (text) identifier for the attribute of interest. As may be appreciated, the attribute is identified as 'NetworkStatus'.

Text control 532 contains a value '/usr/bin/netstat −n' indicating that command "netstat −n" (or even a script containing desired instructions) is to be executed on a resource element of interest to poll the value of the causation attribute 'NetworkStatus'. Control 535 indicates a time out period for receiving the output of the netstat command (or can be user defined script as well). Value in control 535 indicates the time period after which execution of the command (contained in text control 532) will cease to be executed.

List box 537 enables a user to specify the agent from which the script (as indicated in text control 532) is launched. Thus, the definition is propagated to all the agents specified by the list box, for eventual association with monitor instances. It is assumed that 'ProactiveServer' represents an agent on the monitor types of interest are present. Once the next button is selected, control passes to FIG. 5D.

Figure 5D:
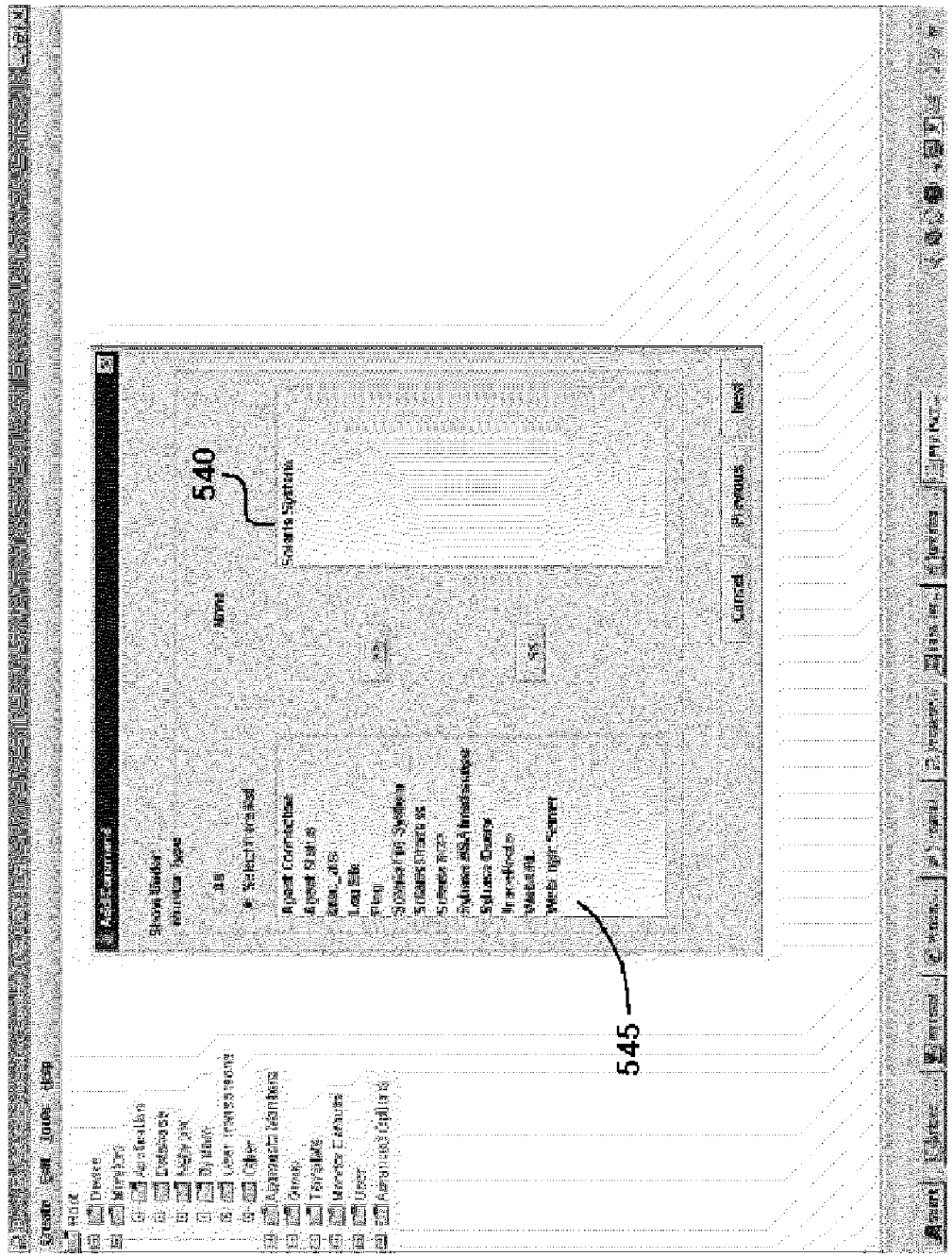

FIG. 5D contains a user interface using which users may specify the monitor types with which the added attribute is to be associated. Accordingly list 545 contains a list of available monitor types and list 540 contains the list of monitor types selected. List 540 contains a value 'Solaris System' indicating that the attribute is added to the monitor type 'Solaris System'.

Various data received through user interface forms contained in FIG. 5A-5D (in monitoring system 110) are stored in database 130.

7. Defining Monitor Instance

Figure 6A:
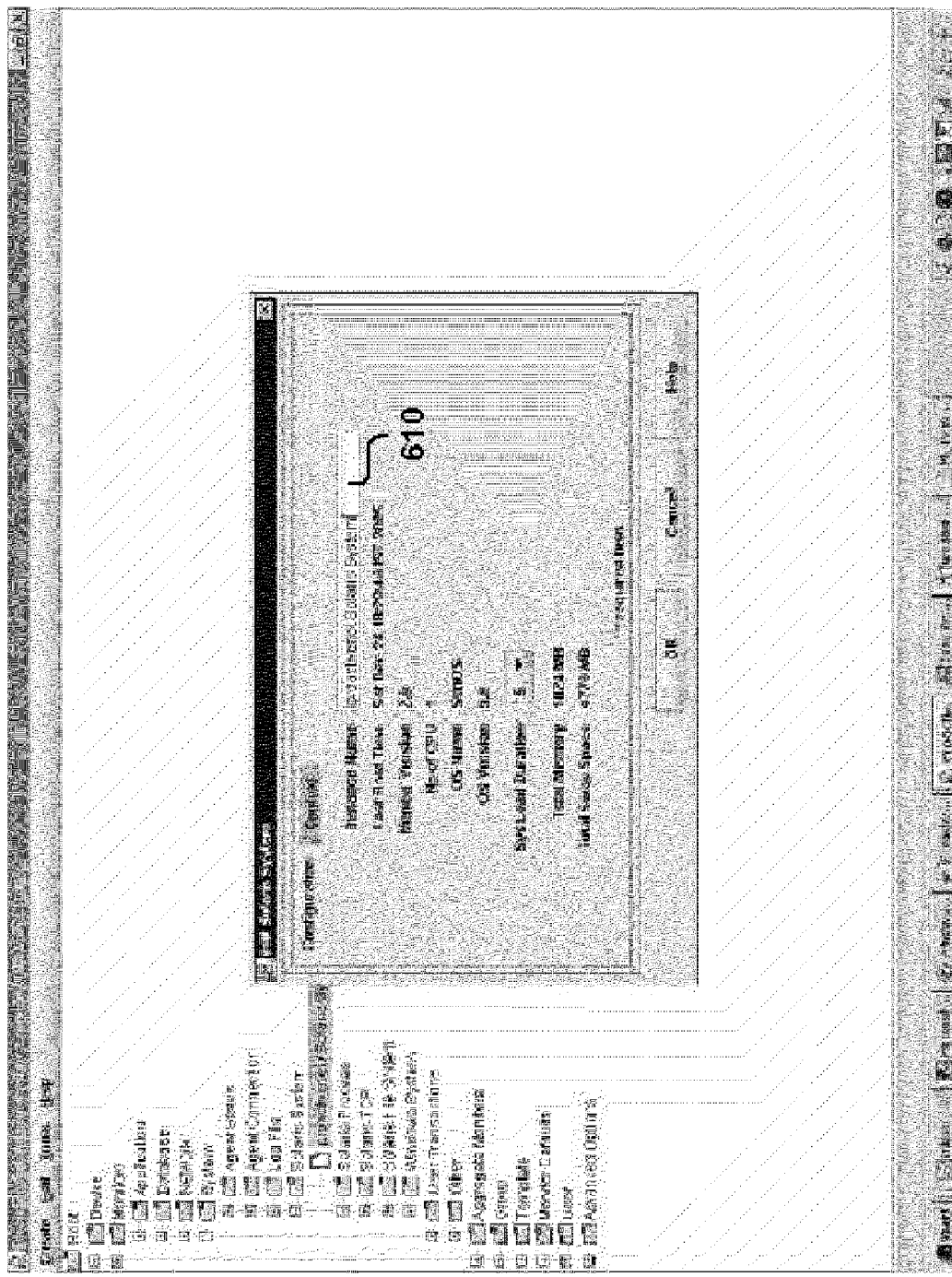
FIGS. 6A-6B contain a graphical user interface used by an administrator while defining a monitor instance to gather information relevant to various attributes of interest for time points when there is no abnormality in a problem attribute.
Figure 6B:
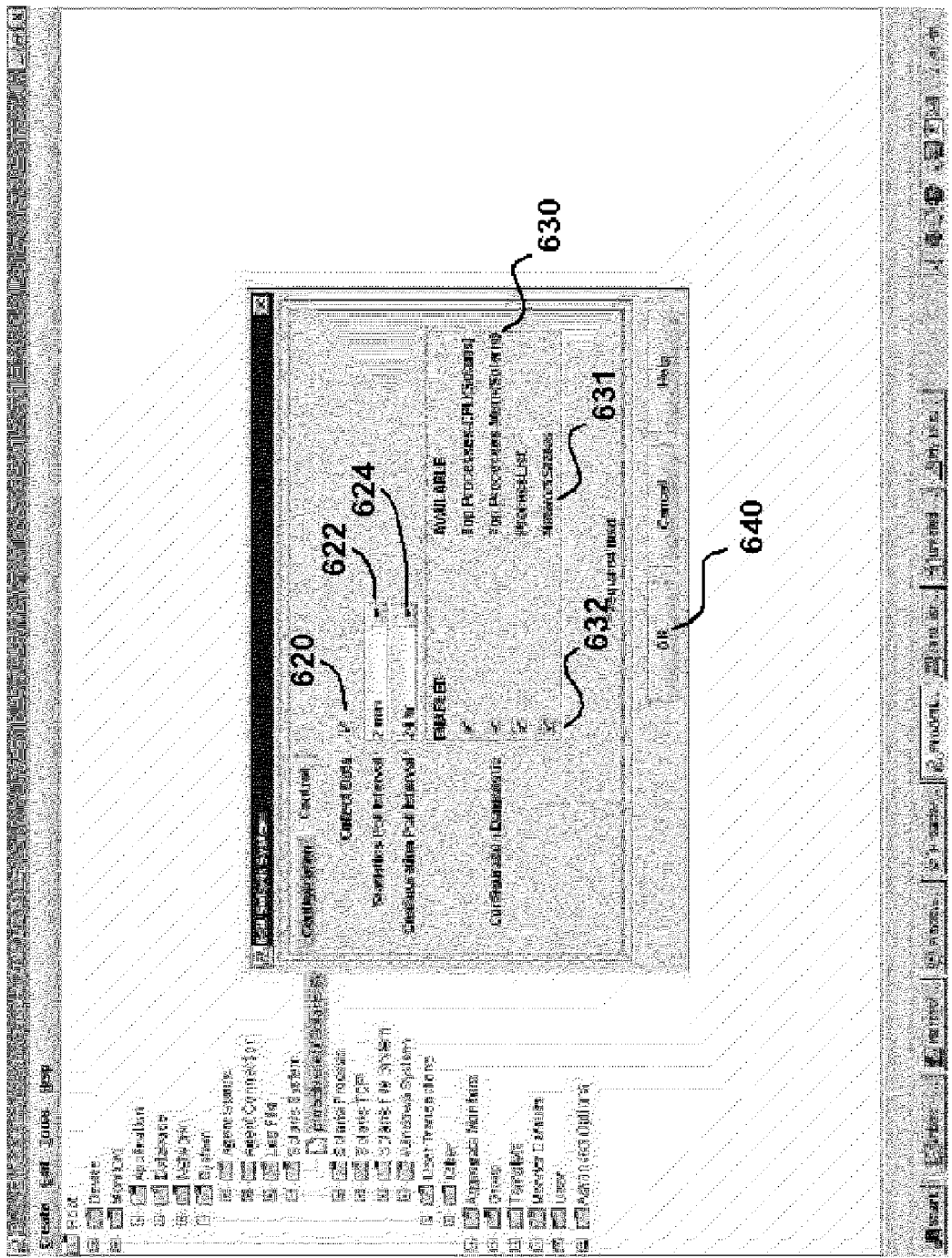

FIGS. 6A and 6B together contain a graphical user interface using which a user may define a monitor instance and specify the polling interval for various attributes sought to be monitored by the monitor instance. Only parameters which are relevant to enabling various features of the present invention are described for conciseness.

Text box 610 (of FIG. 6A) contains a value provided by the user uniquely identifying the monitor instance which monitors the values of various attributes at a poll interval specified in list box control 624.

Portion 630 contains the list of attributes (631) that are available for monitoring. Checking of the check box control (In portion 632) against each of the available causation attributes (in list 631) enables monitoring of the attribute for the resource element while executing the identified monitor instance.

For example, the causation attribute identified by 'NetWorkStatus' (added in FIGS. 5A-5D above) is enabled by selecting the check box control against it in portion 632.

Thus, it may be appreciated that the monitor instance ('ProactiveNet Solaris System') monitors the values of "Top Process-CPU (Solaris)", "Top Process-Mem (Solaris)", "ProcessList", and "Network Status" at time points identified by the polling interval specified in 624.

Selection of OK button 640 enables storing of the configuration values associated with the monitoring instance which monitors values of the causation attributes in database 130.

A user may then specify an alarm rule specifying a problem attribute and the desired causation attributes for the monitor instance, as described below.

8. Alarm Rule

Figure 7A:
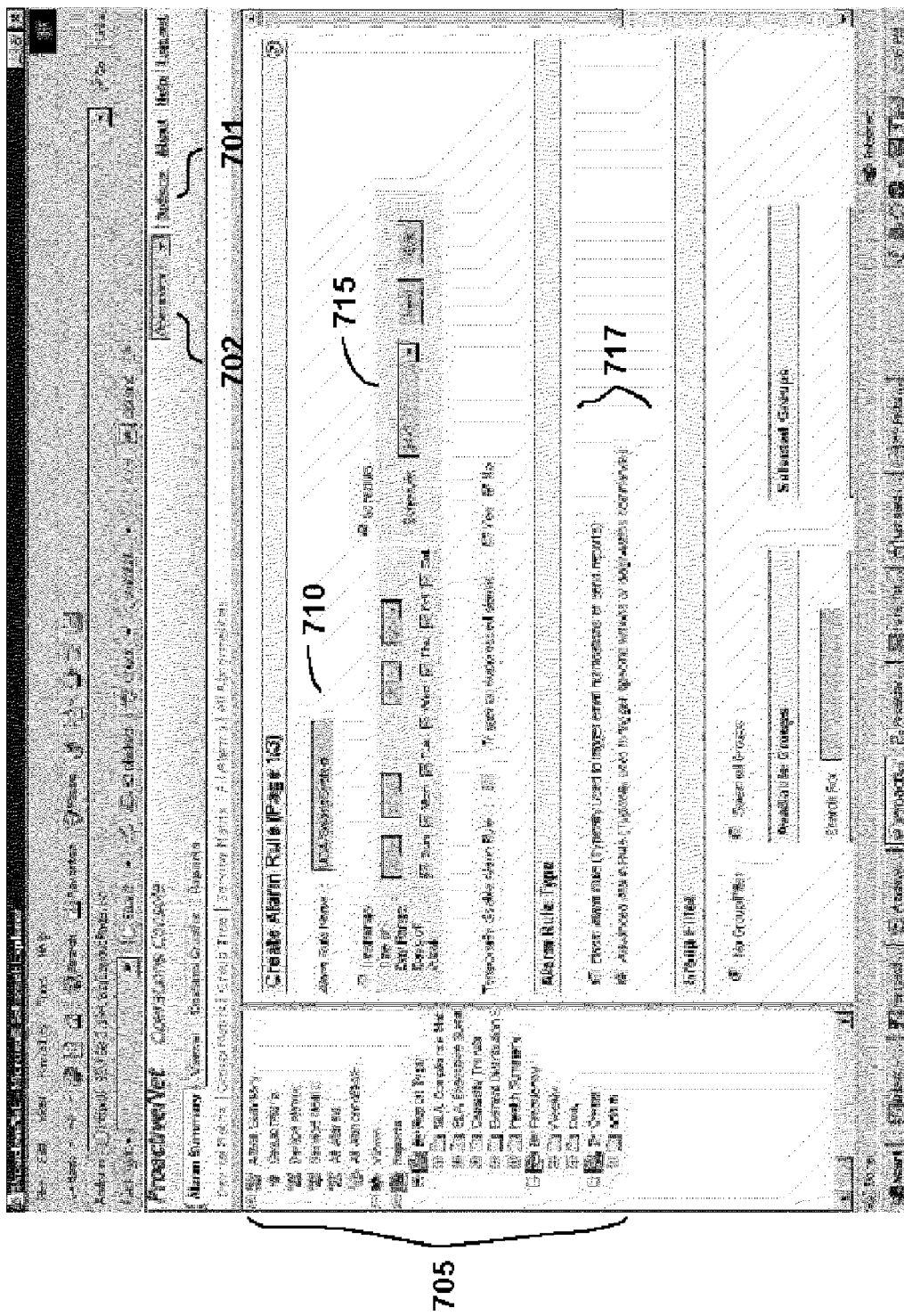
FIGS. 7A-7B contain graphical user interface used by an administrator to define alarm rules indicating the problem attributes (which would cause the abnormality) in an embodiment of the present invention.

FIGS. 7A, 7B, 8 and 9 together are used to specify an alarm rule indicating problem attributes (which would cause the abnormalities) and associated causation attributes. In particular, FIG. 7A depicts that a user has identified the present rule as 'UDA-Solaris System' (portion 71). Selection of values in portion 712 and 715 determines the specific time periods during which the monitor instance needs to be executed.

Selection of radio button control 717 determines the if there are any additional configuration parameters for the abnormality. By selecting the radio button control 'advanced', users are provided with appropriate user interface to provide additional configuration parameters for the abnormality sought to be monitored, as described below with respect to FIG. 7B.

Figure 7B:
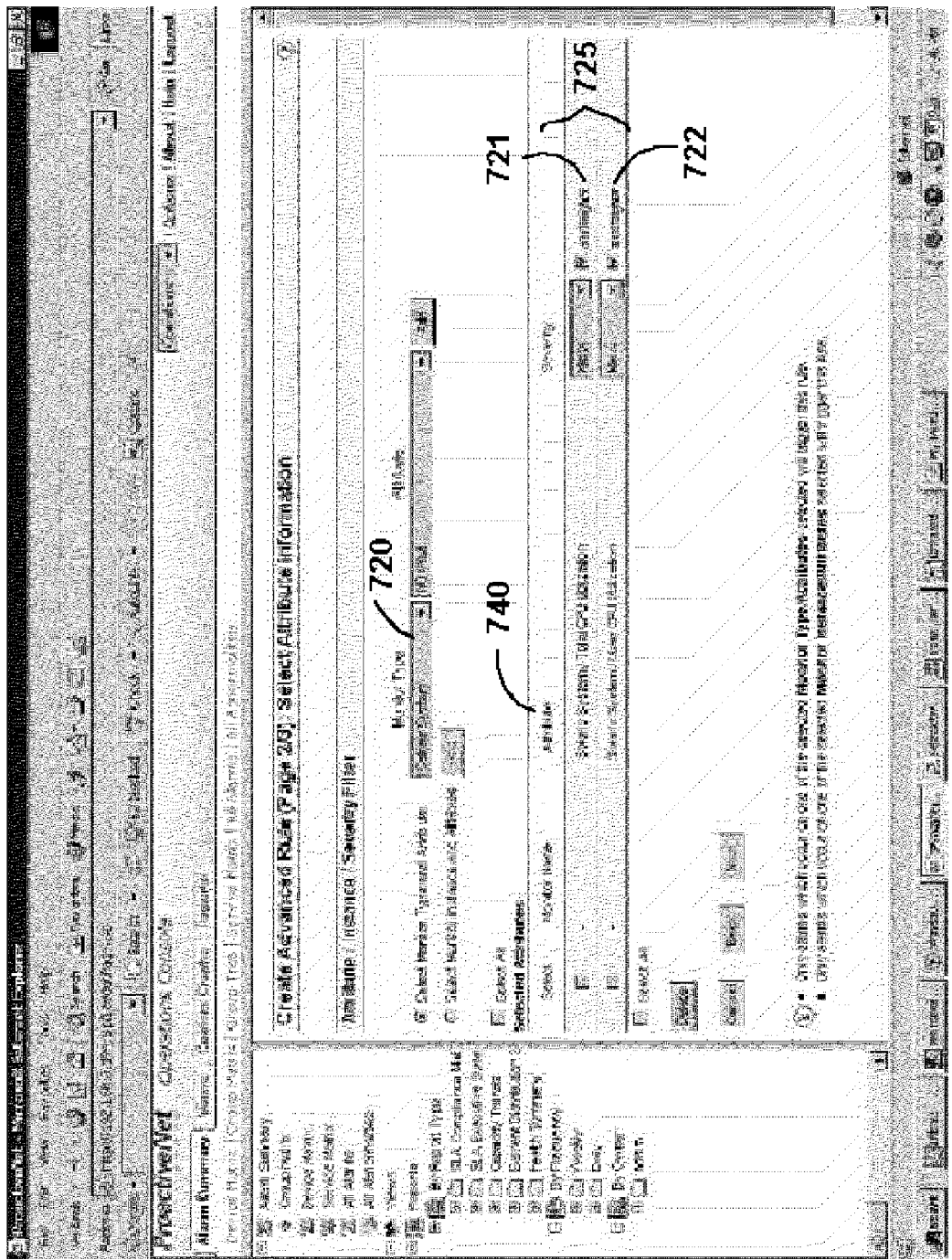

FIG. 7B contains a graphical user interface using which a user may provide additional configuration parameters for the abnormality. List boxes 720 (monitor type) and 721 (the attribute for the monitor type selected by 720) are used to select specific attributes as problem attributes. The selected attributes are added to the list in portion 725, (which may be deleted if desired). Thus, portion 725 contains a list of problem attributes (here, Total CPU Utilization and User CPU Utilization) for the present rule.

The user may define 'abnormality' for each problem attribute in portion 745. Thus, column 745 contains values indicating deviations (from a corresponding base line, computed dynamically from prior history, as described in the related applications) exceeding which the problem attribute is considered to have an abnormal behavior. For example, in line 721, problem attribute 'CPU Utilization' for the resource element Solaris System (in column 740) is considered to be abnormal if the polled value(s) for the problem attribute has exceeded the corresponding threshold value by a value determined by the severity level 'Minor' (described below with respect to FIG. 9) and higher (column 745).

Once the user selects the Next button of FIG. 7B, control passes to the screen of FIG. 8 in which Causation attributes are specified, as described below.

Figure 8:
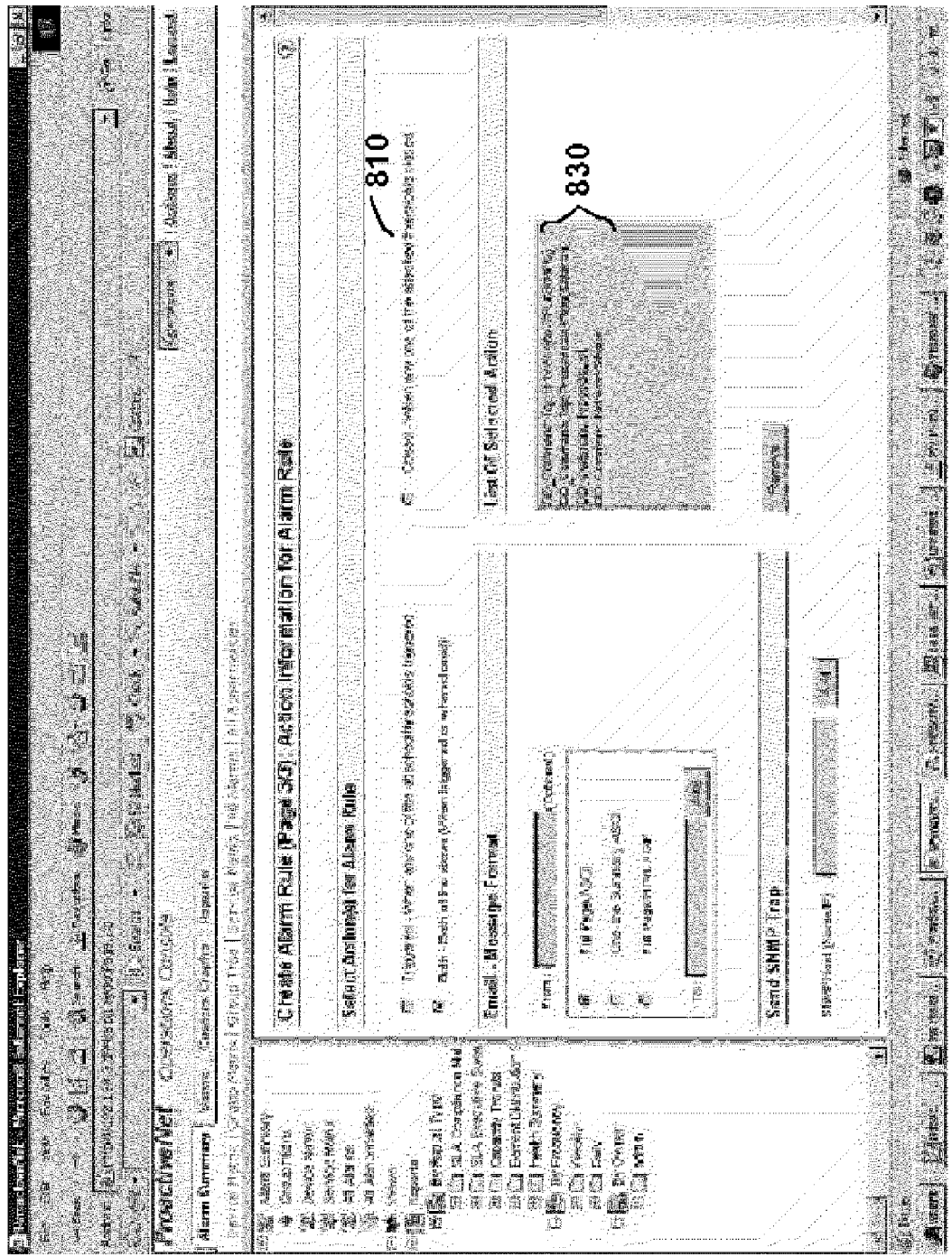
FIG. 8 contains a graphical user interface used by an administrator to define causation attributes associated with the problem attributes indicated in an alarm rule to enable gathering of information relevant from a time point when an abnormality is detected.

FIG. 8 contains a user interface using which a user could specify parameters which in turn enables polling of causation attributes of interest when an abnormality with a problem attribute is encountered. Various controls in the form are described briefly below. The values correspond to the abnormality "UDA-Solaris System" (instance identified in box 710, described above).

Selection of radio button controls 810 determines when the causation attributes are to be monitored. In the example of the Figure, the causation attributes are polled for when any of the thresholds are triggered or when the triggered threshold has been closed.

Portion 830 contains the list of actions representing various causation attributes and/or associated commands to be executed on the resource element(s) being monitored. The line containing "DD_Command NetworkStatus" in portion 830 indicates that the causation attribute (with identifier "NetworkStatus 630") is monitored when an abnormality with the problem attributes (in lines 721/722) is encountered.

Thus, when an 'abnormality' (as specified in lines 721 and 722) is detected for the problem attributes, the causation attributes of portion 830 are monitored. The abnormality definition there is based relative to a 'severity level'. The manner in which the severity level can be specified, is described below.

9. Severity Levels Definition

Figure 9:
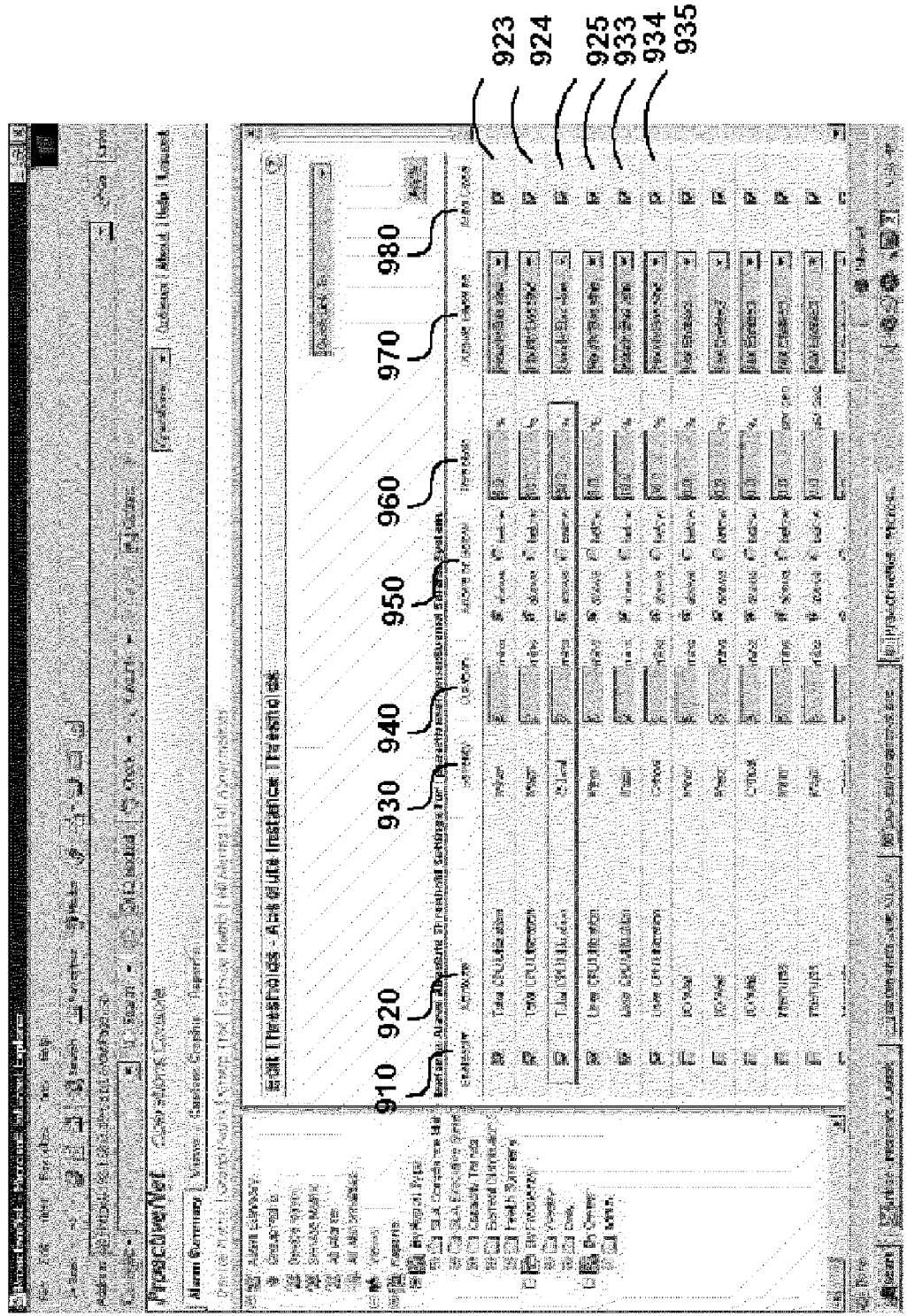
FIG. 9 contains a graphical user interface used by an administrator to define severity associated with deviations in problem attributes from the corresponding threshold value(s).

FIG. 9 contains a user interface which enables users to specify severity levels, based on which abnormality is defined. Each row (923-925 and 933-935) represents a severity level of a problem attribute. Rows 923-925 contain the definition of severity levels for the attribute of line 721 and rows 933-935 contain the definition of severity levels for the attribute of line 722.

Column 'Enabled 910' indicates whether monitoring of the problem attribute of the corresponding row for corresponding threshold value is enabled. When the control is selected, monitoring system 110 performs monitoring of the corresponding problem attribute and determines if the monitored values are within the corresponding threshold values.

Column 920 contains identifiers of the problem attributes. As may be appreciated, rows 923-925 contain a value 'Total CPU Utilization' and 933-935 contain a value 'User CPU Utilization' under column 920.

Column 930 contains a value representing the severity (extent of deviation) from the threshold value as one of the values of 'Minor', 'Major', 'Critical'. Column 940 contains a values indicating the time duration when the polled value is outside of the threshold value for the severity level to match.

Column 950 contains a radio button control indicating whether the polled value is considered abnormal when the value is below the threshold value or the above the threshold value. Columns 960 and 970 indicate the deviation percentage from the threshold value to match the corresponding severity level.

For example, row 923 indicates that a deviation corresponding to a value from the 'Hourly baseline' (column 970) by 5.0% (column 960) for a time duration of 7 minutes (column 940) of the problem attribute 'Total CPU Utilization' (column 920) is considered as a 'minor' (column 930) deviation. Similarly, rows 924 and 925 contains deviations in polled values of the 'Total CPU Utilization' which are considered as 'Major' and 'Critical'.

Thus, when the severity levels defined in FIG. 9 are exceeded per lines 721/722, root cause analysis facilitation block 390 determines that an abnormality has occurred, and causes the polling of causation attributes specified in portion 830. The polled values are stored in database 130. The users can then access the corresponding information using a suitable user interface to perform root cause analysis, as described below in further detail.

10. Root Cause Analysis

Figure 10:
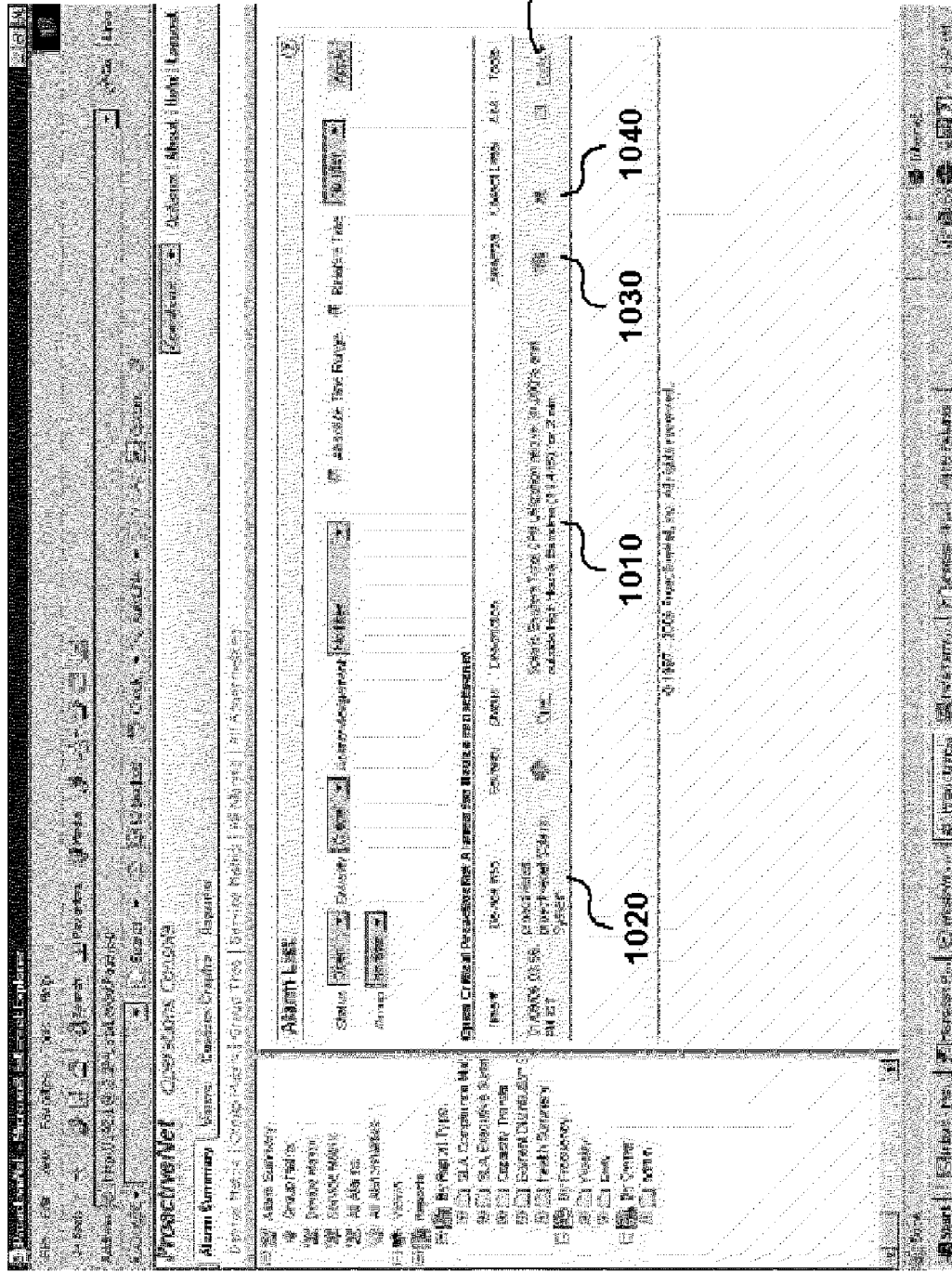
FIG. 10 contains a display screen which displays the alarms previously configured.

FIG. 10 contains a graphical user interface containing the list of alarm rules/abnormalities with each row containing details of an abnormality. For example, line 1001 corresponds to an abnormality of the problem attribute "Total CPU Utilization". Accordingly, column entitled "Description" (1010), contains the corresponding text. Also, text contained in column 1010 indicates the severity corresponding to the abnormality.

Portion of the text contained in column 1020 indicates the resource element type as 'Solaris System' in which an abnormal behavior has been encountered.

Selecting control 1030 (shown in line 1001) displays the information that would facilitate root cause analysis for the abnormality. Control then passes to FIG. 11 in an example embodiment.

Figure 11:
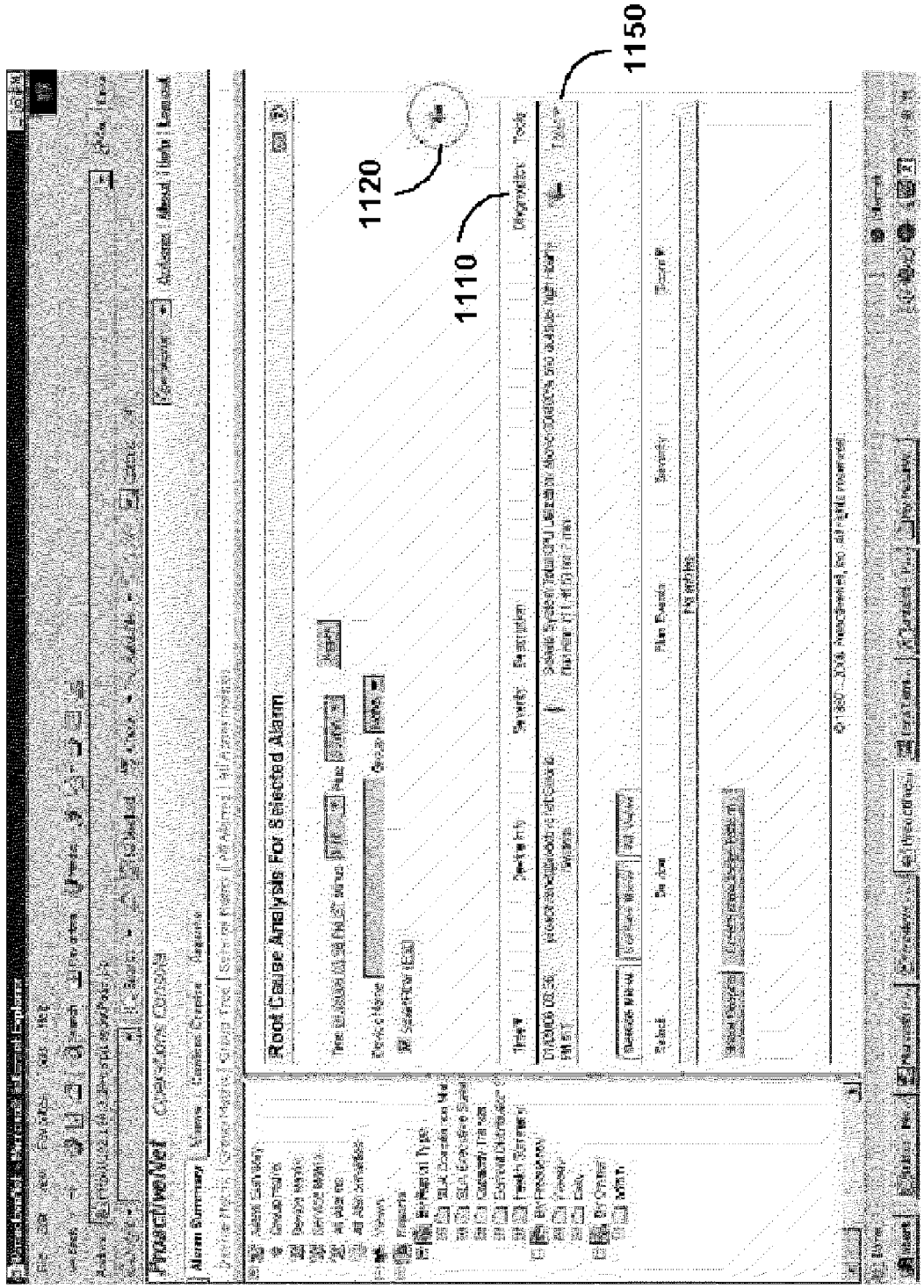
FIG. 11 contains a graphical user interface using which an administrator/user may access information gathered while performing root cause analysis.

Continuing with respect to FIG. 11, Line 1150 corresponds to the abnormality indicated in line 1001. Selecting control 1110 enables a user to view polled values of causation attributes corresponding to the time of occurrence of the abnormality. Selecting control 1120 enables users to view the polled values of causation attributes corresponding to the time points when the abnormality was not encountered.

Figure 12A:
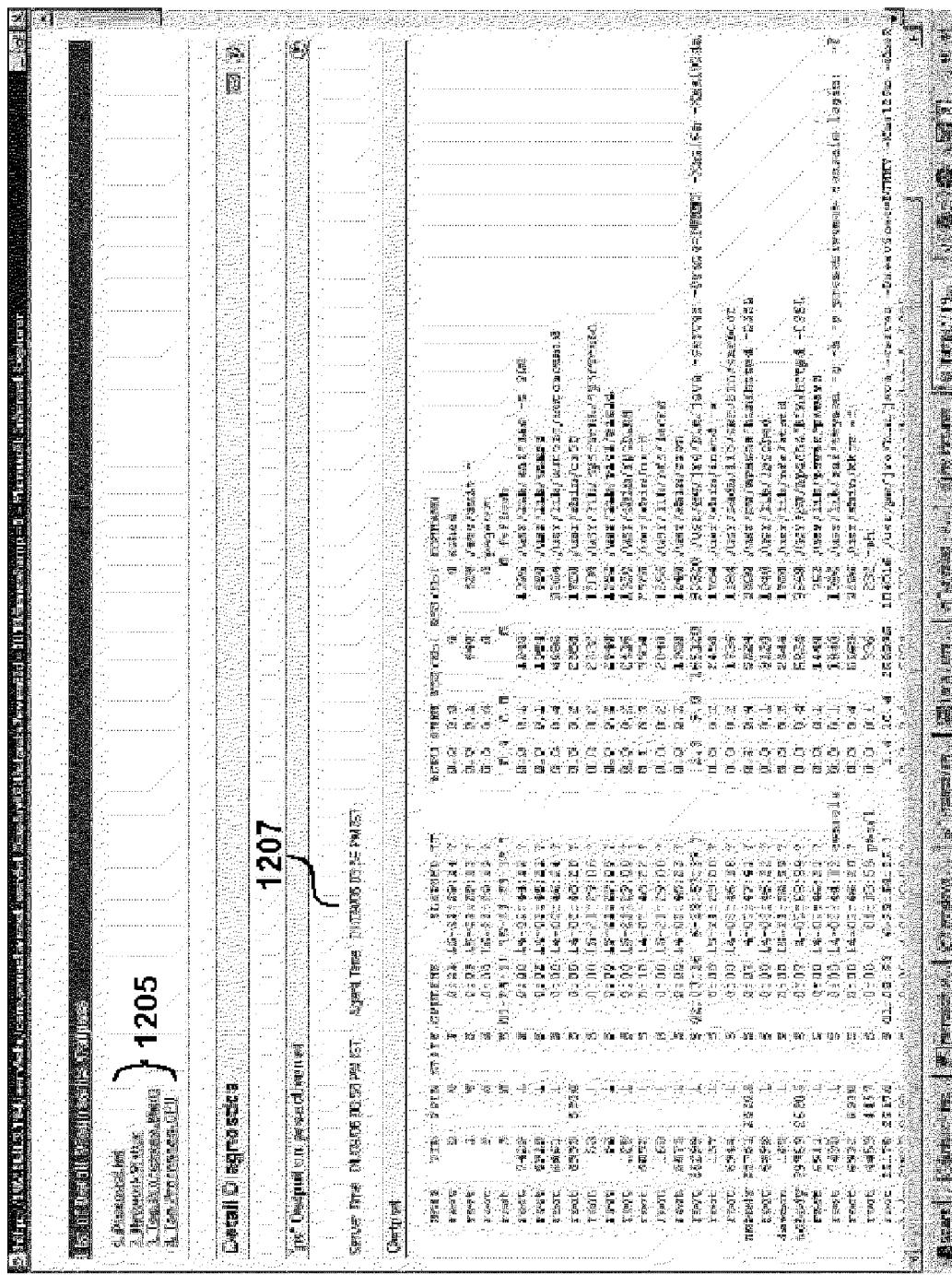
Figure 12B:
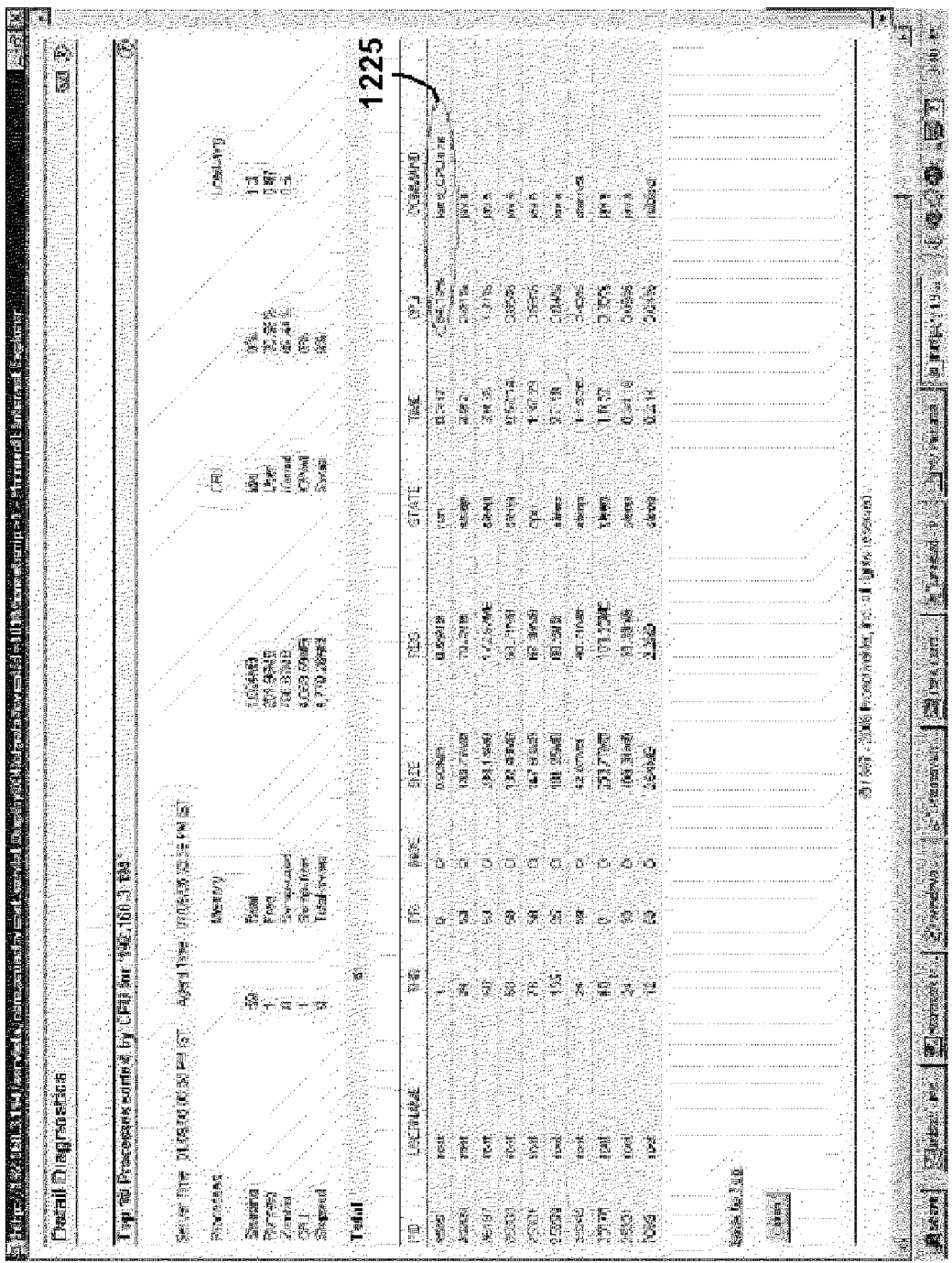
Figure 12C:
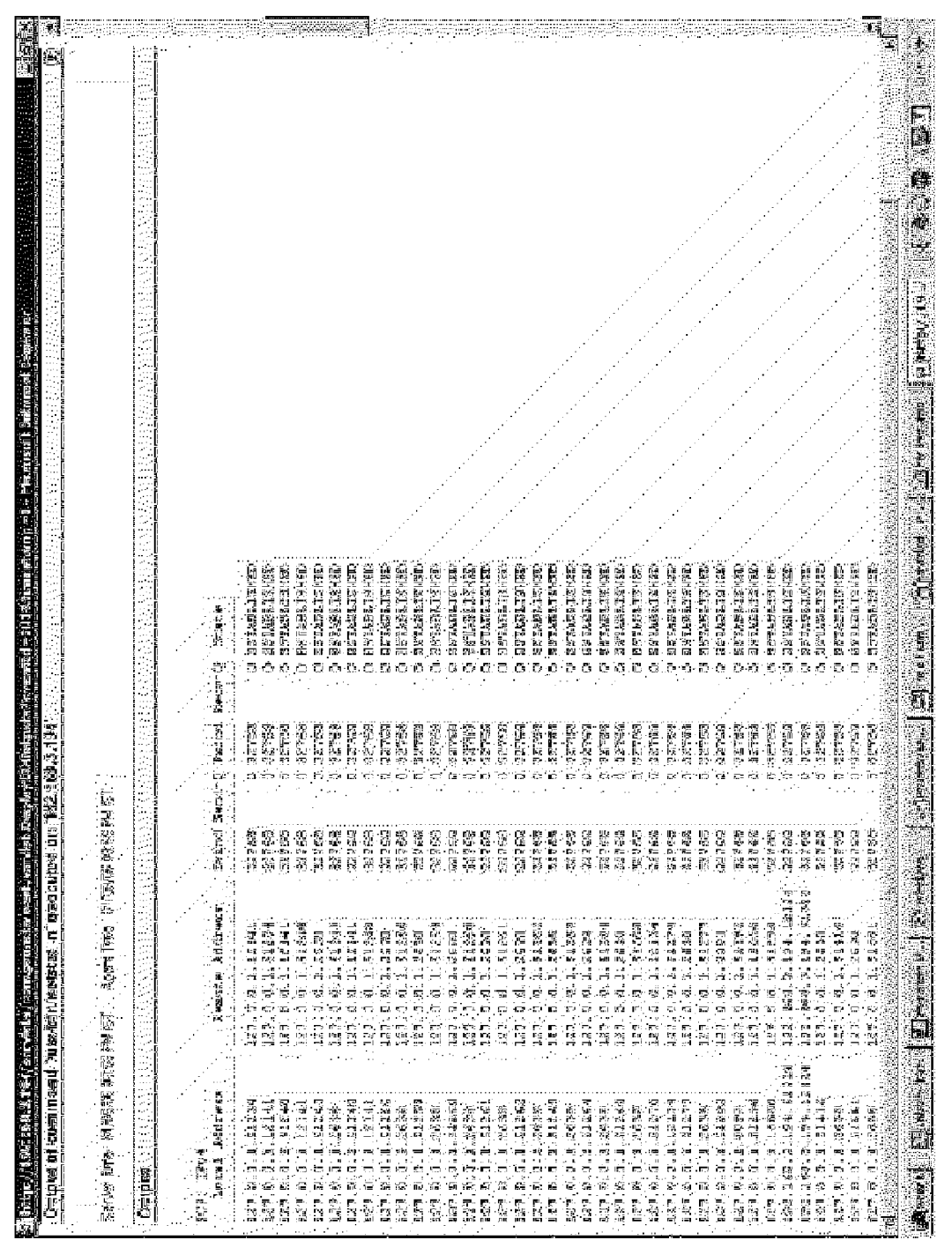

Accordingly, FIGS. 12A-12C contains graphical user interface to display data corresponding to some of the causation attributes contained in portion 830. FIG. 12A contains a user interface to display of data corresponding to 'Process List'. FIG. 12B displays data corresponding to "Top Processes by CPU Utilization" and FIG. 12C contains data that of the causation attribute "Network Status". As may be noted, portion 1225 indicates the corresponding process with PID "4585" could be the possible root cause for the abnormality of line 1001.

Figure 13A:
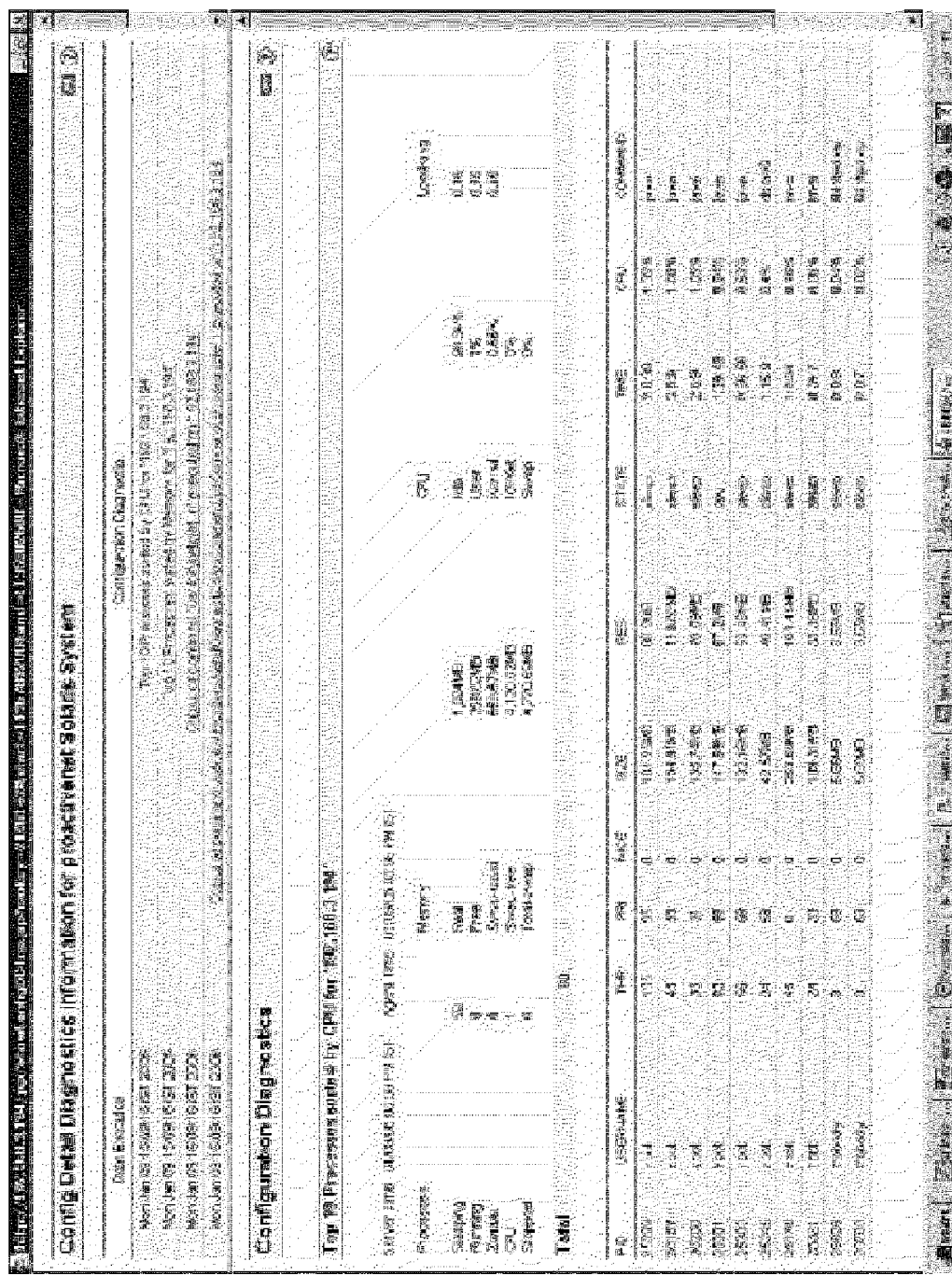
FIGS. 13A-13B contain display screens which contain data relevant to some of the causation attributes which are gathered at time points when there was no abnormality.
Figure 13B:
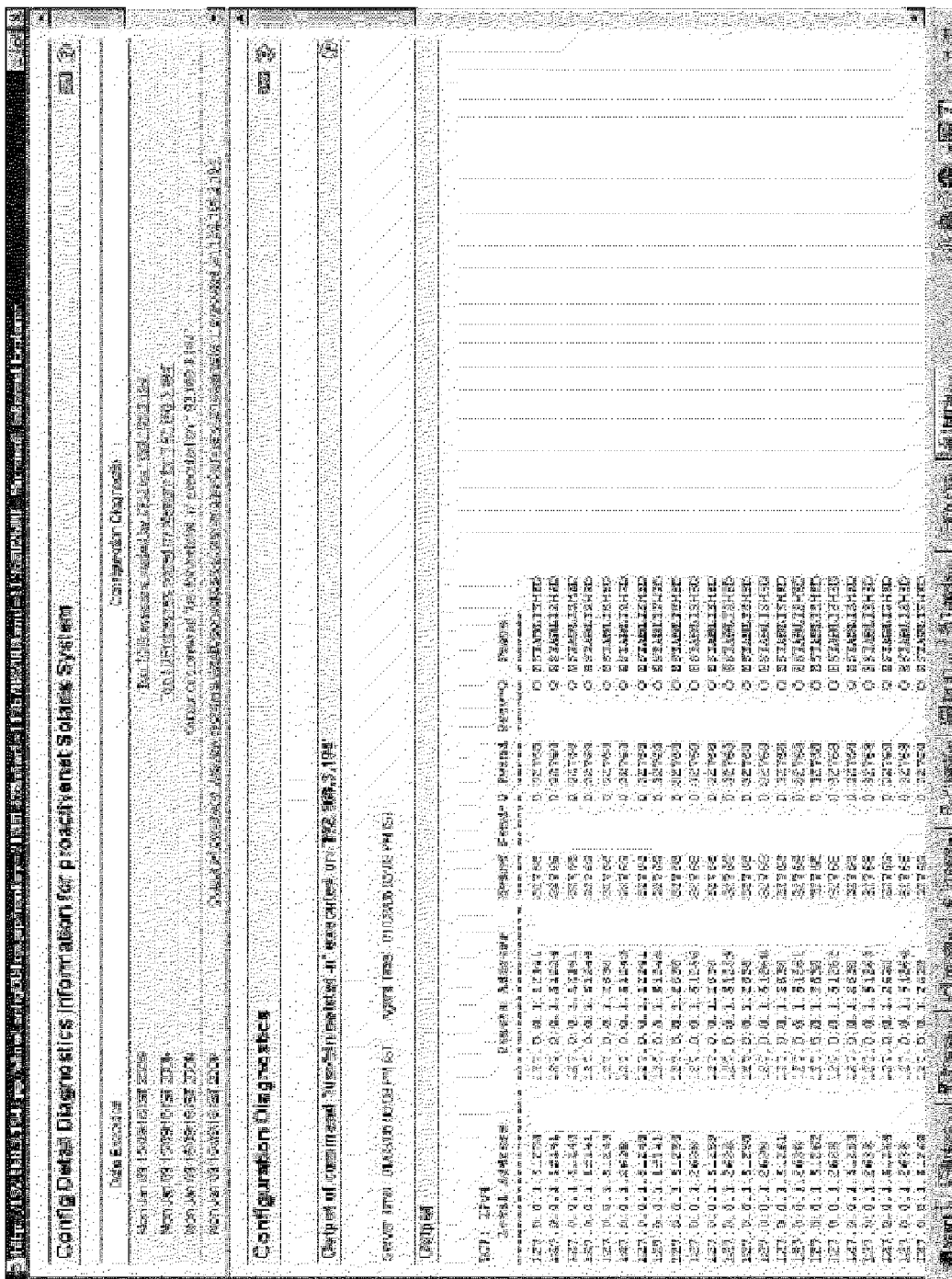

FIGS. 13A and 13B contain graphical user interface to display polled values corresponding to the attributes "Top Processes by CPU Utilization" and "Network Status".

As may be observed from the list of processes displayed in FIG. 13A, the process with identifier "4585" was not executing, when there was no abnormality. Using this information an administrator may determine additional details corresponding to the process ("4585") to perform root cause analysis. Similarly, FIG. 13B contains a list of polled values corresponding to "Network Status".

Thus, the data displayed in figures for abnormal behavior of the 'Solaris System' of 12A and 12C may be used in conjunction with corresponding values for non-abnormal behavior shown in FIGS. 13A, 13B while performing root cause analysis.

It should be understood that the different components of the network management system can be implemented in a combination of one or more of hardware, software and firmware. In general, when throughput performance is of primary consideration, the implementation is performed more in hardware (e.g., in the form of an application specific integrated circuit). When flexibility and/or cost are of primary consideration, the implementation is performed more in software (e.g., using a processor executing instructions provided in software/firmware). Cost and performance can be balanced by implementing with a desired mix of hardware, software and/or firmware. An embodiment implemented substantially in software is described below.

11. Software Implementation

Figure 14:
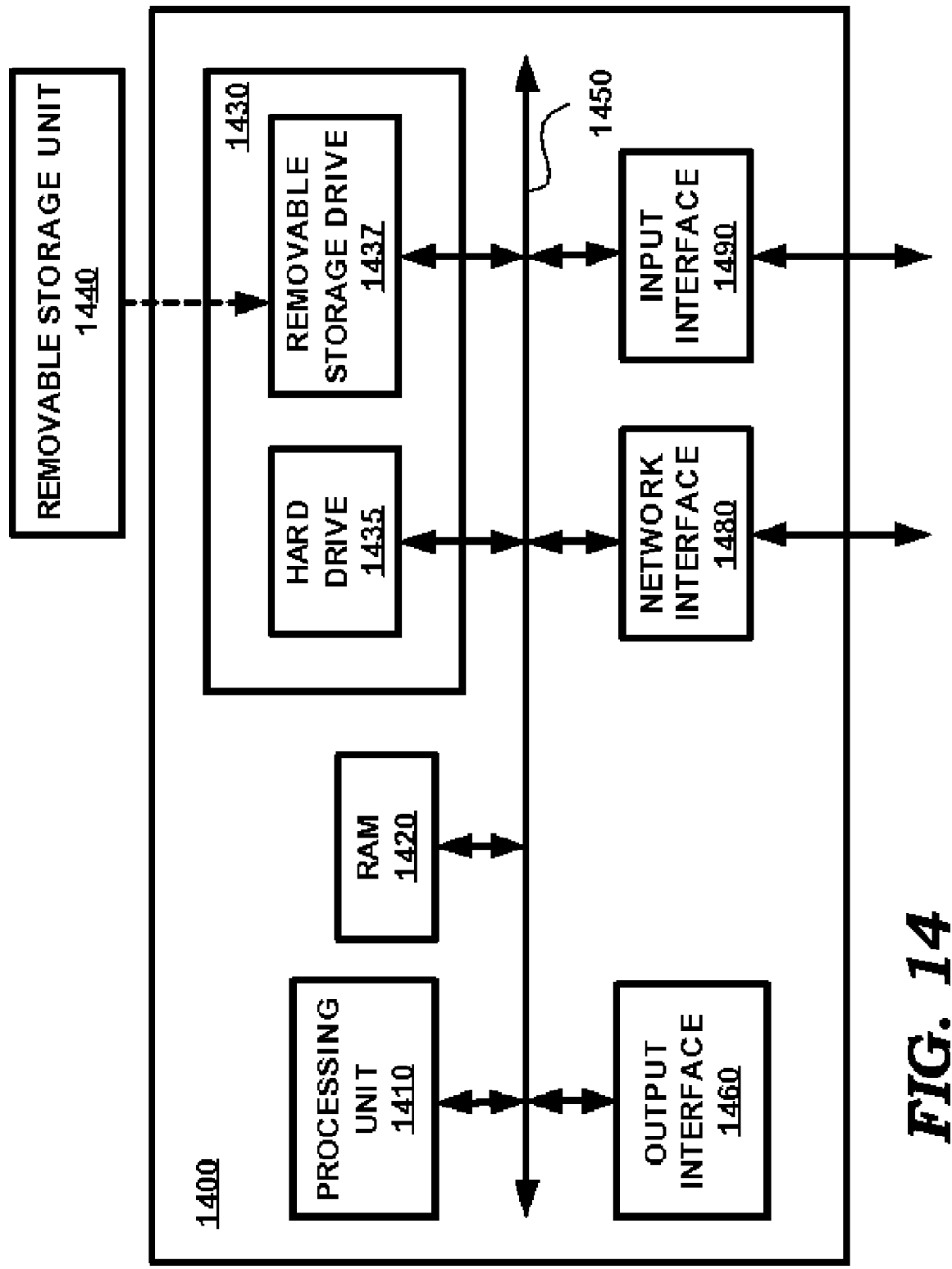
FIG. 14 is a block diagram of a computer system illustrating an example system in which various aspects of the present invention can be implemented.

FIG. 14 is a block diagram illustrating the details of system 1400 in one embodiment. System 1400 may correspond to a portion of monitoring system 110. System 1400 is shown containing processing unit 1410, random access memory (RAM) 1420, secondary memory 1430, output interface 1460, network interface 1480 and input interface 1490. Each component is described in further detail below.

Input interface 1490 (e.g., interface with a key-board and/or mouse, not shown) enables a user/administrator to provide any necessary inputs to system 1400. Output interface 1460 provides output signals (e.g., display signals to a display unit, not shown), and the two interfaces together can form the basis for a suitable user interface for an administrator to interact with system 1400. For example, an administrator may specify the resource elements, corresponding attributes of interest and view the polled values for the specified attributes using the interfaces.

Network interface 1480 may enable system 1400 to send/receive data packets to/from other systems on corresponding paths using protocols such as internet protocol (IP). The packets may form the basis for defining abnormalities for problem attributes of interest and possible causation attributes, viewing the polled values of problem/causation attributes, etc. Network interface 1480, output interface 1460 and input interface 1490 can be implemented in a known way.

RAM 1420 receives instructions and data on path 1450 (which may represent several buses) from secondary memory 1430, and provides the instructions to processing unit 1410 for execution. Secondary memory 1430 may contain units such as hard drive 1435 and removable storage drive 1437. Secondary memory 1430 may store the software instructions and data, which enable system 1400 to provide several features in accordance with the present invention.

Some or all of the data and instructions may be provided on removable storage unit 1440 (or from a network using protocols such as Internet Protocol), and the data and instructions may be read and provided by removable storage drive 1437 to processing unit 1410. Floppy drive, magnetic tape drive, CD_ROM drive, DVD Drive, Flash memory, removable memory chip (PCMCIA Card, EPROM) are examples of such removable storage drive 1437.

Processing unit 1410 may contain one or more processors. Some of the processors can be general purpose processors which execute instructions provided from RAM 1420. Some can be special purpose processors adapted for specific tasks. The special purpose processors may also be provided instructions from RAM 1420.

In general, processing unit 1410 reads sequences of instructions from various types of memory medium (including RAM 1420, secondary memory 1430 and removable storage unit 1440), and executes the instructions to provide various features of the present invention described above. Thus, a medium providing such instructions/data may be referred to as a computer readable medium.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of facilitating root cause analysis in a networked environment with respect to a problem attribute, said method comprising:

specifying, by a user, an alarm rule to specify an association information including information that a set of causation attributes are associated with said problem attribute, wherein said alarm rule includes a definition of an abnormality defining a deviation threshold, wherein when said problem attribute exceeds said deviation threshold, said problem attribute is considered to have an abnormality;

storing said alarm rule in a non-volatile memory;

monitoring, by a monitoring system, a resource element to retrieve values for said problem attribute in said resource element, wherein the monitoring system monitors the resource element by repeatedly polling, at a first polling interval, the set of causation attributes indicated by the alarm rule, the monitoring system also monitoring the resource element for the values of said problem attribute;

storing the values for said problem attribute and said causation attributes in said non-volatile memory;

determining, by the monitoring system, that said abnormality has occurred with respect to said problem attribute in said resource element by examining said stored values, wherein the determination that said abnormality has occurred is performed based on said problem attribute exceeding the deviation threshold indicated by said alarm rule;

polling the resource element for values of each of said set of causation attributes at a second polling interval upon determining that said abnormality has occurred based on said user having specified said alarm rule association information, wherein the second polling interval is less than the first polling interval;

storing said polled values in said non-volatile memory;

displaying said problem attribute to a user;

receiving an indication that the user wishes to perform root cause analysis with respect to said displayed problem attribute; and retrieving and displaying said values of said set of causation attributes stored in said non-volatile memory in response to said user having specified said set of causation attributes in said alarm rule and receiving said indication, wherein said polled values from before the determination that said abnormality has occurred and said polled values from after the determination that said abnormality has occurred are accessible by said user to enable the user to detect any changes in a pattern of polled values of said set of causation attributes.

2. The method of claim 1, further comprising enabling said user to specify a single polling interval associated with said set of causation attributes and said problem attribute, wherein said problem attribute of interest and said set of causation attributes are polled with said single polling interval when said abnormality has not occurred.

3. The method of claim 1, wherein the monitoring system contains a set of attributes for a resource element, said set of attributes being provided by a vendor of said monitoring system, said method further comprising:

enabling said user to add a new attribute as one of said set of causation attributes, wherein said new attribute is not contained in said set of attributes.

4. The method of claim 1, wherein said definition of said abnormality comprises exceeding one of a plurality of severity levels, wherein each severity level is characterized by falling outside of a threshold by a specified fraction for a specified duration.

5. A computer readable storage medium storing instructions for causing a monitoring system to facilitate root cause analysis for an abnormality with respect to a problem attribute of interest, which when executed by a processor causes the processor to perform actions comprising:

specifying, by a user, an alarm rule to specify an association information including information that a set of causation attributes are associated with said problem attribute, wherein said alarm rule includes a definition of an abnormality defining a deviation threshold, wherein when said problem attribute exceeds said deviation threshold, said problem attribute is considered to have an abnormality;

storing said alarm rule in a non-volatile memory;

monitoring, by a monitoring system, a resource element to retrieve values for said problem attribute in said resource element, wherein the monitoring system monitors the resource element by repeatedly polling, at a first polling interval, the set of causation attributes indicated by the alarm rule, the monitoring system also monitoring the resource element for the values of said problem attribute;

storing the values for said problem attribute and said causation attributes in said non-volatile memory;

determining, by the monitoring system, that said abnormality has occurred with respect to said problem attribute in said resource element by examining said stored values, wherein the determination that said abnormality has occurred is performed based on said problem attribute exceeding the deviation threshold indicated by said alarm rule;

polling the resource element for values of each of said set of causation attributes at a second polling interval upon determining that said abnormality has occurred based on said user having specified said alarm rule association information, wherein the second polling interval is less than the first polling interval such that more detailed information is available upon occurrence of said abnormality;

storing said polled values in said non-volatile memory;

displaying said problem attribute to a user;

receiving an indication that the user wishes to perform root cause analysis with respect to said displayed problem attribute; and retrieving and displaying said values of said set of causation attributes stored in said non-volatile memory in response to said user having specified said set of causation attributes in said alarm rule and receiving said indication, wherein said polled values from before the determination that said abnormality has occurred and said polled values from after the determination that said abnormality has occurred are accessible by said user to enable the user to detect any changes in a pattern of polled values of said set of causation attributes.

6. The computer readable medium of claim 5, further comprising enabling said user to specify a single polling interval associated with said set of causation attributes and said problem attribute.

7. The computer readable medium of claim 5, wherein the monitoring system contains a set of attributes for a resource element, said set of attributes being provided by a vendor of said monitoring system, further comprising:

enabling said user to add a new attribute as one of said set of causation attributes, wherein said new attribute is not contained in said set of attributes.

8. The computer readable medium of claim 5, wherein said definition of said abnormality comprises exceeding one of a plurality of severity levels, wherein each severity level is characterized by falling outside of a threshold by a specified fraction for a specified duration.

9. A system comprising: a memory; a processor to retrieve one or more instructions from said memory and to execute said one or more instructions to cause said system to facilitate root cause analysis in a networked environment with respect to a problem attribute by performing a set of actions, said set of actions comprising:

specifying, by a user, an alarm rule to specify an association information including information that a set of causation attributes are associated with said problem attribute, wherein said alarm rule includes a definition of an abnormality defining a deviation threshold, wherein when said problem attribute exceeds said deviation threshold, said problem attribute is considered to have an abnormality;

storing said alarm rule in a non-volatile memory;

monitoring, by a monitoring system, a resource element to retrieve values for said problem attribute in said resource element, wherein the monitoring system monitors the resource element by repeatedly polling, at a first polling interval, the set of causation attributes indicated by the alarm rule, the monitoring system also monitoring the resource element for the values of said problem attribute;

storing the values for said problem attribute and said causation attributes in said non-volatile memory;

determining, by the monitoring system, that said abnormality has occurred with respect to said problem attribute in said resource element by examining said stored values, wherein the determination that said abnormality has occurred is performed based on said problem attribute exceeding the deviation threshold indicated by said alarm rule;

polling the resource element for values of each of said set of causation attributes at a second polling interval upon determining that said abnormality has occurred based on said user having specified said alarm rule association information, wherein the second polling interval is less than the first polling interval such that more detailed information is available upon occurrence of said abnormality;

storing said polled values in said non-volatile memory;

displaying said problem attribute to a user;

receiving an indication that the user wishes to perform root cause analysis with respect to said displayed problem attribute; and retrieving and displaying said values of said set of causation attributes stored in said non-volatile memory in response to said user having specified said set of causation attributes in said alarm rule and receiving said indication, wherein said polled values from before the determination that said abnormality has occurred and said polled values from after the determination that said abnormality has occurred are accessible by said user to enable the user to detect any changes in a pattern of polled values of said set of causation attributes.

10. The system of claim 9, further comprising enabling said user to specify a single polling interval associated with said set of causation attributes and said problem attribute.

11. The system of claim 9, wherein the monitoring system contains a set of attributes for a resource element, said set of attributes being provided by a vendor of said monitoring system, further comprising:

enabling said user to add a new attribute as one of said set of causation attributes, wherein said new attribute is not contained in said set of attributes.

12. The system of claim 9, wherein said definition of said abnormality comprises exceeding one of a plurality of severity levels, wherein each severity level is characterized by falling outside of a threshold by a specified fraction for a specified duration.

* * * * *

UNITED STATES PATENT AND TRADEMARK OFFICE
CERTIFICATE OF CORRECTION

| | |
|---|---|
| PATENT NO. | : 7,783,744 B2 |
| APPLICATION NO. | : 11/308430 |
| DATED | : August 24, 2010 |
| INVENTOR(S) | : Atul Garg et al. |

It is certified that error appears in the above-identified patent and that said Letters Patent is hereby corrected as shown below:

On the Title Page, in line 1 of the information corresponding to "Item (75) Inventors", replace "Autal Garg, Bangalore CA (US)" with -- Atul GARG, Saratoga, CA (US) --

Signed and Sealed this
Fourth Day of January, 2011

David J. Kappos
*Director of the United States Patent and Trademark Office*